US011886796B2

(12) United States Patent
Bleiweiss et al.

(10) Patent No.: US 11,886,796 B2
(45) Date of Patent: Jan. 30, 2024

(54) COLLABORATIVE MATTER MANAGEMENT AND ANALYSIS

(71) Applicants: Ofer Bleiweiss, Beverly Hills, CA (US); Jeremiah Kelman, Beverly Hills, CA (US)

(72) Inventors: Ofer Bleiweiss, Beverly Hills, CA (US); Jeremiah Kelman, Beverly Hills, CA (US)

( * ) Notice: Subject to any disclaimer, the term of this patent is extended or adjusted under 35 U.S.C. 154(b) by 551 days.

(21) Appl. No.: 16/950,473

(22) Filed: Nov. 17, 2020

(65) Prior Publication Data

US 2021/0065320 A1 Mar. 4, 2021

Related U.S. Application Data

(63) Continuation-in-part of application No. 14/296,287, filed on Jun. 4, 2014, now abandoned, which is a
(Continued)

(51) Int. Cl.
| | |
|---|---|
| *G06F 40/134* | (2020.01) |
| *G06Q 50/18* | (2012.01) |
| *G06Q 10/10* | (2023.01) |
| *G06N 20/00* | (2019.01) |
| *G06F 16/93* | (2019.01) |
| *G06F 18/214* | (2023.01) |
| *G06V 30/40* | (2022.01) |

(52) U.S. Cl.
CPC ............ *G06F 40/134* (2020.01); *G06F 16/93* (2019.01); *G06F 18/214* (2023.01); *G06N 20/00* (2019.01); *G06Q 10/103* (2013.01); *G06Q 50/18* (2013.01); *G06V 30/40* (2022.01)

(58) Field of Classification Search
None
See application file for complete search history.

(56) References Cited

U.S. PATENT DOCUMENTS

| | | | |
|---|---|---|---|
| 6,738,760 B1 * | 5/2004 | Krachman | G06Q 50/26 |
| | | | 707/999.009 |
| 2003/0112270 A1 * | 6/2003 | Newell | G06F 16/954 |
| | | | 715/738 |

(Continued)

OTHER PUBLICATIONS

Fersini, et al. "Semantics and machine learning: A new generation of court management systems." In Knowledge Discovery, Knowledge Engineering and Knowledge Management: IC3K 2010, Valencia, Spain, Oct. 25-28, 2010, Revised Selected Papers 2, pp. 382-398. Springer Berlin Heidelberg, 2013. (Year: 2013).*

*Primary Examiner* — Frank D Mills
(74) *Attorney, Agent, or Firm* — Cotman Ip Law Group

(57) ABSTRACT

A collaborative matter management and analysis tool is presented. Each matter has its own workspace that is built around a collaborative backbone. Users can provide access to the matter workspace to anyone who they want to collaborate with, including others at their organization and persons outside the organization, such as clients, lawyers, experts, vendors and other third parties. Processing of the document is automatic and based on the content and document type. The document, when uploaded, is OCR'd and based on the content, citations are converted to hyperlinks and the cited documents are linked. Documents and events are associated to enable enhanced productivity tools such as searching and e-brief.

20 Claims, 16 Drawing Sheets

Related U.S. Application Data continuation-in-part of application No. 13/935,425, filed on Jul. 3, 2013, now Pat. No. 9,507,758.

(56) References Cited

U.S. PATENT DOCUMENTS

| | | | | |
|---|---|---|---|---|
| 2007/0271517 A1* | 11/2007 | Finkelman | ............. | G06Q 50/18 |
| | | | | 715/742 |
| 2008/0082352 A1* | 4/2008 | Schmidtler | ............ | G06Q 10/10 |
| | | | | 705/2 |
| 2008/0086432 A1* | 4/2008 | Schmidtler | ........... | G06F 16/353 |
| | | | | 706/14 |
| 2008/0086433 A1* | 4/2008 | Schmidtler | ............ | G06N 20/10 |
| | | | | 707/E17.09 |
| 2010/0169250 A1* | 7/2010 | Schmidtler | ............ | G06N 20/00 |
| | | | | 706/46 |
| 2010/0250474 A1* | 9/2010 | Richards | ................ | G06Q 10/06 |
| | | | | 706/46 |
| 2014/0279716 A1* | 9/2014 | Cormack | ............. | G06F 16/285 |
| | | | | 706/11 |

* cited by examiner

COPY

CHARLES S. BARQUIST (CA BAR NO. 133785)
ANTHONY L. PRESS (CA BAR NO. 125827)
STEVEN M. HAINES (CA BAR NO. 166677)
MORRISON & FOERSTER LLP
555 West Fifth Street
Los Angeles, California 90013-1024
Telephone: 213.892.5200
Facsimile: 213.892.5454
cbarquist@mofo.com
apress@mofo.com
shaines@mofo.com W. STEPHEN SMITH
JEFFREY A. JAECKEL
MORRISON & FOERSTER LLP
2000 Pennsylvania Ave., NW
Washington, D.C. 20006-1888
Telephone: 202.887.1500
Facsimile: 202.887.0763
smith@mofo.com
jjaeckel@mofo.com Attorneys for Plaintiff
SPACE EXPLORATION TECHNOLOGIES
CORPORATION

UNITED STATES DISTRICT COURT

CENTRAL DISTRICT OF CALIFORNIA

SPACE EXPLORATION TECHNOLOGIES CORPORATION,

Plaintiff, v.

THE BOEING COMPANY and LOCKHEED MARTIN CORPORATION,

Defendants.

Case No. CV05-7533 FMC (MANx)

COMPLAINT FOR:

1. Violation of Section 1 of the Sherman Act;
2. Violation of Section 2 of the Sherman Act;
3. Violation of Section 7 of the Clayton Act;
4. Violation of Racketeer Influenced and Corrupt Organizations Act;
5. RICO Conspiracy;
6. Violation of the Cartwright Act (Unreasonable Restraint of Trade);
7. Violation of the Cartwright Act (Conspiracy to Monopolize);
8. Violation of Section 17200 of Cal. Bus. & Prof. Code

DEMAND FOR JURY TRIAL

COMPLAINT; DEMAND FOR JURY TRIAL

FIGURE 10B

10. ENJOINING Boeing and Lockheed Martin from engaging in further anticompetitive conduct in violation of the California Cartwright Act;

11. ENJOINING Boeing and Lockheed Martin from engaging in further unfair business practices in violation of Section 17200 of the California Business & Professions Code;

12. AWARDING SpaceX actual and exemplary damages resulting from Boeing and Lockheed Martin's unlawful conspiracy and conduct in furtherance of their conspiracy, including without limitation, treble damages under 15 U.S.C. § 15(a), Section 16750 of the California Cartwright Act, and such other exemplary damages as are available at law, including those available on account of Boeing and Lockheed Martin's oppression, fraud, or malice, and attorneys' fees and costs;

13. AWARDING SpaceX all damages available under 18 U.S.C. § 1964(c), including without limitation treble damages, and attorneys' fees and costs; and 14. PROVIDING SpaceX such other and further relief as the Court may deem just and proper under the circumstances.

Dated: October 19, 2005 — 1016

CHARLES S. BARQUIST
ANTHONY L. PRESS
STEVEN M. HAINES
MORRISON & FOERSTER LLP

By: 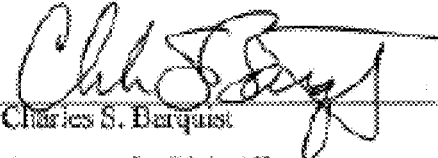
Charles S. Barquist

Attorneys for Plaintiff
SPACE EXPLORATION
TECHNOLOGIES
CORPORATION

FIGURE 10C

Case 1:07-cv-09600-JPO-DCF  Document 42-2  Filed 01/05/09  Page 17 of 17  ⸺1018 d.    Treble damages as appropriate under New York GBL §§ 349(h) and 350-e;

e.    Attorney's fees as appropriate under New York GBL §§ 349(h) and 350-e;

f.    Pre-judgment interest; and g.    Such other and further legal and equitable relief (including rescission as appropriate) as may be just and proper.

Dated: New York, New York  
October , 2007

Respectfully submitted,

By: _____  
Shawn Patrick Regan  
Thomas G. Slater (to be admitted *pro hac vice*)  
HUNTON & WILLIAMS LLP  
200 Park Avenue, 52nd Floor  
New York, New York 10166-0136  
(212) 309-1000  
sregan@hunton.com -and- Layn R. Phillips (to be admitted *pro hac vice*)  
Bruce A. Wessel (to be admitted *pro hac vice*)  
Melissa R. McCormick (to be admitted *pro hac vice*)  
IRELL & MANELLA LLP  
840 Newport Center Drive, Suite 400  
Newport Beach, California 92660-6324  
(949) 760-0991

*Attorneys for Plaintiff*  
*WILLIAM I. KOCH*

FIGURE 10D

| | | |
|---|---|---|
| From: | Ofer Bleiweiss | |
| Sent: | Sunday, August 4, 2009 9:41 AM | |
| To: | Marc Bauer; Noam Bleiweiss; Vikas Desai; Eli Schmulkintz | |
| Cc: | Jeremiah Kelman | |
| Subject: | MBN-V | |

1102

Hey guys,

Lorem ipsum dolor sit amet, consectetur adipiscing elit. Nulla in est ligula. Donec pellentesque accumsan ipsum, eget laoreet tellus bibendum id. Curabitur nec feugiat augue. Sed luctus, quam eget viverra mollis, ligula mauris varius nulla, luctus consequat ipsum lacus vitae lorem. Quisque at turpis ligula. Donec in dolor justo. Quisque nec tortor ultrices, ultrices eros a, placerat ipsum. Cras ac turpis urna. Suspendisse congue justo in dolor feugiat aliquet. Sed blandit rutrum molestie. Vestibulum egestas id arcu non dictum. Maecenas iaculis venenatis elit ac auctor. In suscipit venenatis tellus, congue tincidunt turpis semper in. Ut vestibulum libero ut nulla interdum, dictum ultricies nunc tincidunt. Quisque porttitor pretium nulla sed consectetur. Sed ac tellus at nisl imperdiet porttitor ac ut orci.

Nulla vulputate augue eget semper convallis. Morbi eget molestie eros, non elementum quam. Nulla pharetra vestibulum convallis. Mauris cursus dui lacus, ac mattis nisl aliquet vitae. Quisque eu libero et neque euismod eleifend in nec turpis. Nulla facilisi. Curabitur sodales congue euismod. Class aptent taciti sociosqu ad litora torquent per conubia nostra, per inceptos himenaeos. Fusce ut dapibus sem. Duis hendrerit nulla sit amet metus pretium varius. Nam eleifend rutrum ligula, id consequat leo sagittis vitae. Praesent dignissim sapien vel urna egestas dictum.

-O

1104 — CONFIDENTIAL

COLLABORATIVE MATTER MANAGEMENT AND ANALYSIS

CROSS REFERENCE TO RELATED APPLICATIONS

The present application is a continuation in part of U.S. patent application Ser. No. 14/296,287, filed on Jun. 4, 2014, which is a continuation in part of U.S. patent application Ser. No. 13/935,425, filed on Jul. 3, 2013, now U.S. Pat. No. 9,507,758, specifications of which are herein incorporated by reference in their entirety.

BACKGROUND OF THE INVENTION

Field of the Invention

Embodiments of the invention described herein pertain to the field of matter management. More particularly, but not by way of limitation, one or more embodiments of the invention enable collaborative management and analysis of legal matters.

Description of the Related Art

Litigators perform critical job functions by working with a massive universe of documents consisting of evidence, attorney work product, legal research, and case filings. A small fraction of this universe of documents is relevant or "critical" at any given time to a lawyer's day-to-day case needs. This small fraction of critical documents, however, is also in its own right a large universe of documents. For example, whereas in a typical case there could be a few million documents exchanged by the parties, between a few hundred and a thousand key documents will typically be used in connection with depositions, motions and trials. In addition, lawyers must manage and access a docket or "master file" of court and litigation documents, including pleadings, motion papers, discovery requests and responses, correspondence, deposition transcripts and video, and legal work product, which in total can consist of several thousand individual documents. In order to perform their day-to-day substantive tasks (e.g., research, writing, analysis, depositions, hearings, trial) lawyers need to effectively manage, organize, and have rapid on-demand access to every individual key document.

Current systems for storing and collaborating around key documents are fragmented, overloaded, slow, and ill-equipped for the specific demands and needs of lawyers engaged in high-stakes, fast-paced, document-intensive litigation. With respect to management of evidence, the massive volume of documents requires lawyers to use complex review databases that are specifically designed for the purposes of culling through large sets of documents. These databases are not designed to enable easy, streamlined, and rapid access to individual or more limited sets of key documents.

Currently there are a number of solutions for litigation management and analysis. These solutions fall into four categories: (a) Case Analysis Software, (b) e-Discovery Review Tools, (c) Document Management Systems, and (d) General Enterprise Collaboration Software.

Case Analysis Software. The current slate of case analysis software is limited, difficult to use, ineffective, and not collaborative. The primary solutions are not designed with a litigator's day-to-day workflow in mind.

E-Discovery Review Tools. E-discovery review tools serve a particular purpose in the life of the litigation: These tools are designed to house thousands or millions of documents to facilitate a large-scale review, performed manually by attorneys or automated by a method such as predictive coding. This review can be done for the purposes of determining what documents need to be produced to the other side, to review what the other side produced to determine what is important, or both. Partners, senior attorneys, and clients typically stay away from these solutions, relying on junior associates and support staff to pull documents they need. We view these tools as complementary to our invention, and essential to conduct the massive review necessary to identify the key documents housed within the present invention. The present invention effectively sits on top of these massive databases, and all the key documents identified in the database are easily fed into the present invention.

Document Management Systems ("DMS"). The primary use of DMS by law firms is for version control in document drafting. As with e-discovery review tools, we view this use as complementary to the present invention. Some firms store the master file for the case via their DMS, i.e., the litigation and court documents, like pleadings, discovery, motions, transcripts, orders and the like. Other firms use a combination of DMS and network folders to store the master file. Popular DMS have little to no collaborative elements. They are also not cloud based, meaning increased IT and hardware expenditures. They also offer a very archaic and unintuitive user interface.

General Enterprise Collaboration Software. These solutions are not viable options for the legal industry. They offer no case management or analysis features, or anything specific to litigation. Without extensive custom implementation these solutions will, at best, be extremely limited in their ability to help litigators do what they need to do.

Typical products in the case analysis and e-discovery review space use tables to display items such as documents. Each row in the column represents a different document. Each column represents a different attribute about the item. Users can customize and add numerous columns to the table layout. This often results in a table that extends beyond the right edge of the screen. This creates a number of problems: First, it requires extensive scrolling to find needed information. Second, there is no system organizing the columns based on the type of content they contain or their relationship to other columns. This makes it difficult for the user to know where to look for needed information. Third, when the user scrolls beyond the edge of the screen, the user quickly loses the ability to identify what item is represented by a given row.

In light of the complexity and volume of documents that lawyers deal with, and the limitations of existing software solutions, teams of administrative staff such as legal secretaries, litigation clerks, paralegals, and litigation technology specialists spend a substantial portion (if not the vast majority) of their time managing and organizing documents. With respect to critical case documents, this process often occurs manually, without significant automation by software or technology. With little standardization of organizing case documents and little technical assistance from software, it is common for the process of organizing documents to be carried out directly by more expensive junior attorneys, who chose to avoid the inefficiencies of working with layers of staff. As a result, expensive, highly trained lawyers often spend more of their time performing administrative tasks and dealing with cumbersome systems and processes for managing documents, than on the substantive legal tasks that they are best equipped to perform (e.g., research, analysis, writing). Moreover, clients, co-counsel and experts do not have readily-available access to the same universe of documents and work product as the primary outside litigation counsel. Therefore, communication and collaboration between these groups is often inefficient and not optimally productive.

With the ever-increasing scope and cost of litigation caused by the explosion of e-discovery, corporate in-house counsel are demanding greater efficiency and transparency from their outside litigation counsel. As such, litigators need an efficient system for managing, collaborating around, and sharing critical case documents. Addressing this need would increase cost-efficiency, improve client communication, and lead to better case results by freeing up attorney time for substantive tasks, and by providing better insight into key evidence and the complex relationships between key documents and witnesses.

BRIEF SUMMARY OF THE INVENTION

One or more embodiments of the present invention comprise an efficient platform for managing, sharing, analyzing, and collaborating around the most critical matter documents and information. By way of example, a matter can be civil litigation, criminal prosecution, arbitration, mediation or a transaction. The platform can be accessed via the web and with any device, including tablet and mobile phone, from anywhere so long as there is internet access.

Each matter has its own workspace built around a collaborative backbone. Lawyers can provide access to the matter workspace to anyone who they want to collaborate with, including others at their organization and persons outside the organization, such as clients, lawyers, experts, vendors and other third parties. The workspace offers a suite of tools designed for lawyers to manage every aspect of a matter from start to finish. These include tools to manage, analyze, and relate documents and files, or portions of those documents and files, including evidence, litigation and court documents, attorney work product, legal authorities, and transactional documents. It also includes tools to manage tasks, deadlines, and workflow. Additionally, the present invention aggregates information and automatically and intelligently relates documents, key persons, issues, user comments, attorney work product and other metadata in real time.

In one or more embodiments of the present invention, when a document is uploaded into the system, it is automatically OCR'd (Optical Character Recognition) and the results are analyzed and stored in the metadata of the document. For example, the system checks if the document is Bates stamped. If the document has a Bates stamp, the present invention will capture the beginning Bates stamp and calculate the document's Bates range. This information will be stored in the metadata for the document. The document will also be associated with the party that produced the document and production volume containing it.

In one or more embodiments of the present invention, the system automatically checks if a newly loaded item (e.g., a document) is a Version of an existing item. If so, the items are linked as Versions of one another.

One or more embodiments of the present invention will automatically scan each newly loaded document for citations to other documents. Every citation is converted into a hyperlink that links to a cited document that is located in the system. If the cited document is not located in the system, it will create a placeholder entry for the document in the appropriate location (e.g., Evidence). Citations to legal authorities that are not in the system will be pulled automatically from a legal resource database, uploaded to the system, and linked to the document.

Also, all items and metadata are scanned for Players. When an item or its metadata relate to a Player, the item is automatically associated with the Player and added to the Player's File. When a new Player is added, the Player is checked against all items and metadata for items that should be affiliated with the Player. The system also tracks how Players relate to one another and to issue tags.

The invention also offers organizational features. These include features to leverage an organization's expertise, manage shared contacts, and aggregate, access and analyze organization documents, including work product and resources.

The platform is intended to provide users with instant access to everything they would want to know about their matters, updated in real time to reflect contributions by the team, and enable them to collaborate with others within and outside the organization.

BRIEF DESCRIPTION OF THE DRAWINGS

The above and other aspects, features and advantages of the invention will be more apparent from the following more particular description thereof, presented in conjunction with the following drawings wherein:

FIG. 4 is an illustration of the basic information tab in accordance with one or more embodiments of the present invention.

FIG. 5 is an illustration of the timing tab in accordance with one or more embodiments of the present invention.

FIGS. 10A-D are illustrations of parsing a typical Master File document in accordance with one or more embodiments of the present invention.

FIG. 11 is an illustration of parsing a typical evidence production page in accordance with one or more embodiments of the present invention.

DETAILED DESCRIPTION

A system and method for collaborative matter management and analysis will now be described. In the following exemplary description, numerous specific details are set forth in order to provide a more thorough understanding of the embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The terms "first," "second" and the like, herein do not denote any order, quantity or importance, but rather are used to distinguish one element from another, and the terms "a" and "an" herein do not denote a limitation of quantity, but rather denote the presence of at least one of the referenced item.

Figure 1:
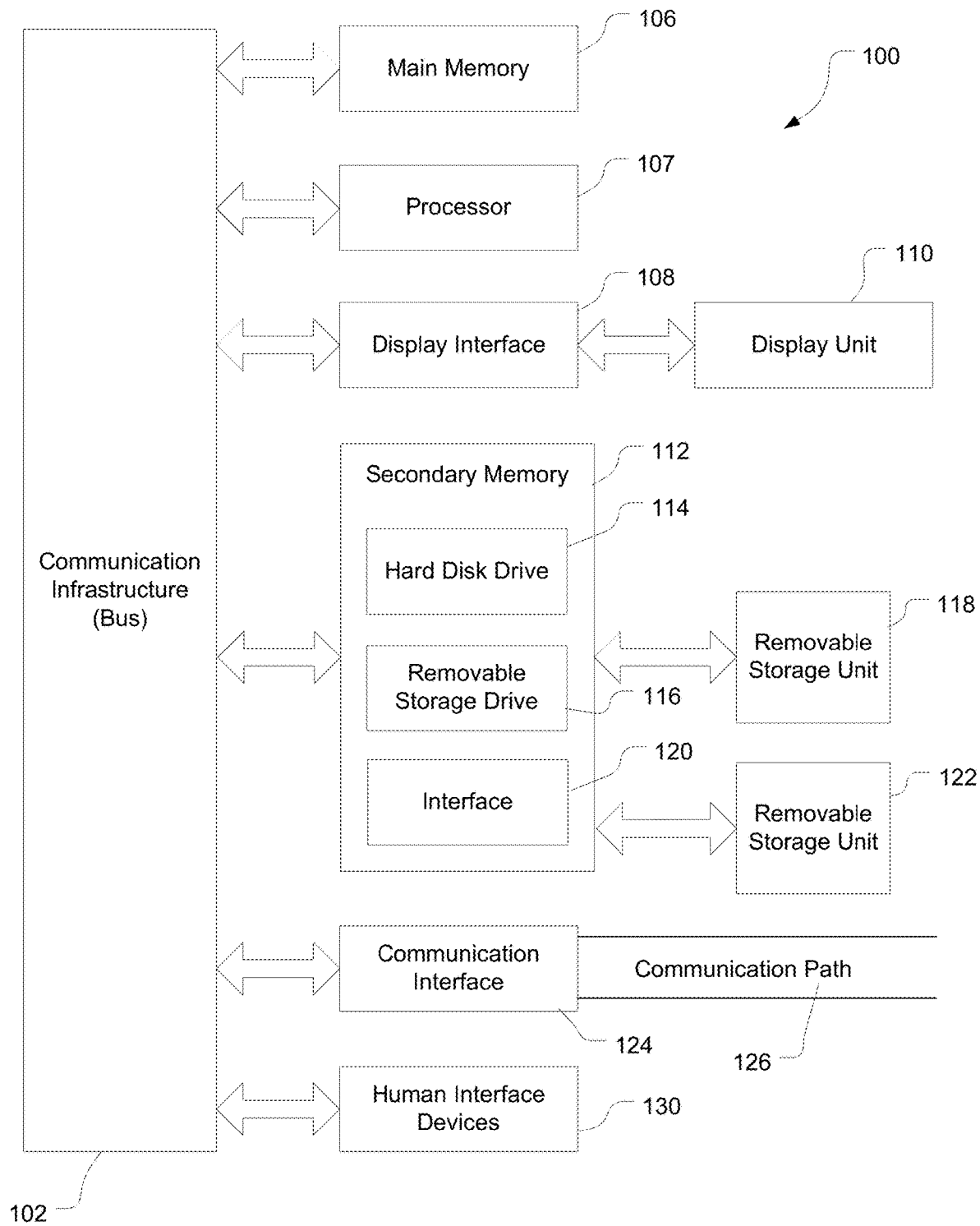
FIG. 1 illustrates a general purpose computer and peripherals that when programmed as described herein may operate as a specially-programmed computer capable of implementing one or more methods, apparatus and/or systems of the solution.

FIG. 1 diagrams a general purpose computer and peripherals, when programmed as described herein, may operate as a specially-programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general purpose computer system such as processor 107, main memory 106, display interface 108, secondary memory 112 and/or communication interface 124.

Main memory 106 may provide a computer-readable medium for accessing stored data and executing applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially-programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), wireless networks, optical networks, distributed networks, the Internet, the Cloud, or any combination thereof are some examples of the type of communication paths that may be utilized by the specially-programmed computer system. Communication path 126 may comprise any type of telecommunication network or interconnection fabric that can transport data to and from communication interface 124.

To facilitate user interaction with the specially-programmed computer system, one or more human interface devices (HID) 130 may be provided. Some examples of HIDs that enable users to input commands or data to the specially-programmed computer system may comprise a keyboard, mouse, touch screen devices, microphones or other audio interface devices, motion sensors or the like, as well as any other device able to accept any kind of human input and in turn communicate that input to processor 107 to trigger one or more responses from the specially-programmed computer system are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments of the present invention comprise a system and method for managing, sharing, analyzing, and collaborating around the most critical matter documents and information. The system of the present invention comprises one or more client computers 100, one or more network servers, and one or more software platforms (e.g., modules) executing the methods of the present invention thereon. Client computer 100 could be a desktop computer, a laptop, a tablet, a smart phone, etc. that provides the user an interface to the software platform.

Embodiments of the present invention provide software systems and components that execute on computer systems and similar systems for analysis and collaboration about a document by tracking all comments and communications about the document thereby creating work product. The comments and/or communications may be through social media, email, reviewing of the document itself, etc. irrespective of the media or original input source of the comment, it tracks to the document. The present invention ties user comments to the items they are made about. For example, when a user accesses a document, she can access every conversation and comment made about that document.

In one or more embodiments of the present invention, each document comprises the file itself (e.g., a Master File document), and one or more metadata fields. In a preferred embodiment, the metadata fields include: OCR'd text field; Evidence Tray; Master File Tray; Legal Authority Tray, etc. Additional metadata may be added for other functions, for instance, for associating a document with Players, party, date, document type, etc.

Master File

The Master File is an important element in the processes of the present invention. The Master File stores the documents created during the course and for the purpose of a matter (e.g., litigation). This includes pleadings, motions, deposition transcripts and videos, hearing transcripts, orders, discovery requests and responses, and more. For instance, the documents may be organized in a hierarchical structure based on a lead document, for example in a motion sequence (e.g., Opening Brief, Opposition, Reply, Hearing Transcript, Order, etc.). The hierarchical arrangement is automatically provided based on the document type of the lead document or can be manually assigned by the user.

The Master File has an interface that enables users to relate multiple items and define the relations between the items. These relations include Versions, Attachments, Families, Clusters, etc. Any document can have Attachments. Relating multiple documents creates a Family. Relating Families creates a Cluster (e.g., motion, opposition, reply, hearing and order). Clusters can also be related (e.g., relating a motion Cluster with the meet and confer correspondence Cluster related to the motion). The Master File has multiple views where the items are automatically organized and ordered based on these relations. Note that the terminologies used herein are not intended to be limiting in any way so long as the appropriate function is achieved.

Figure 2:
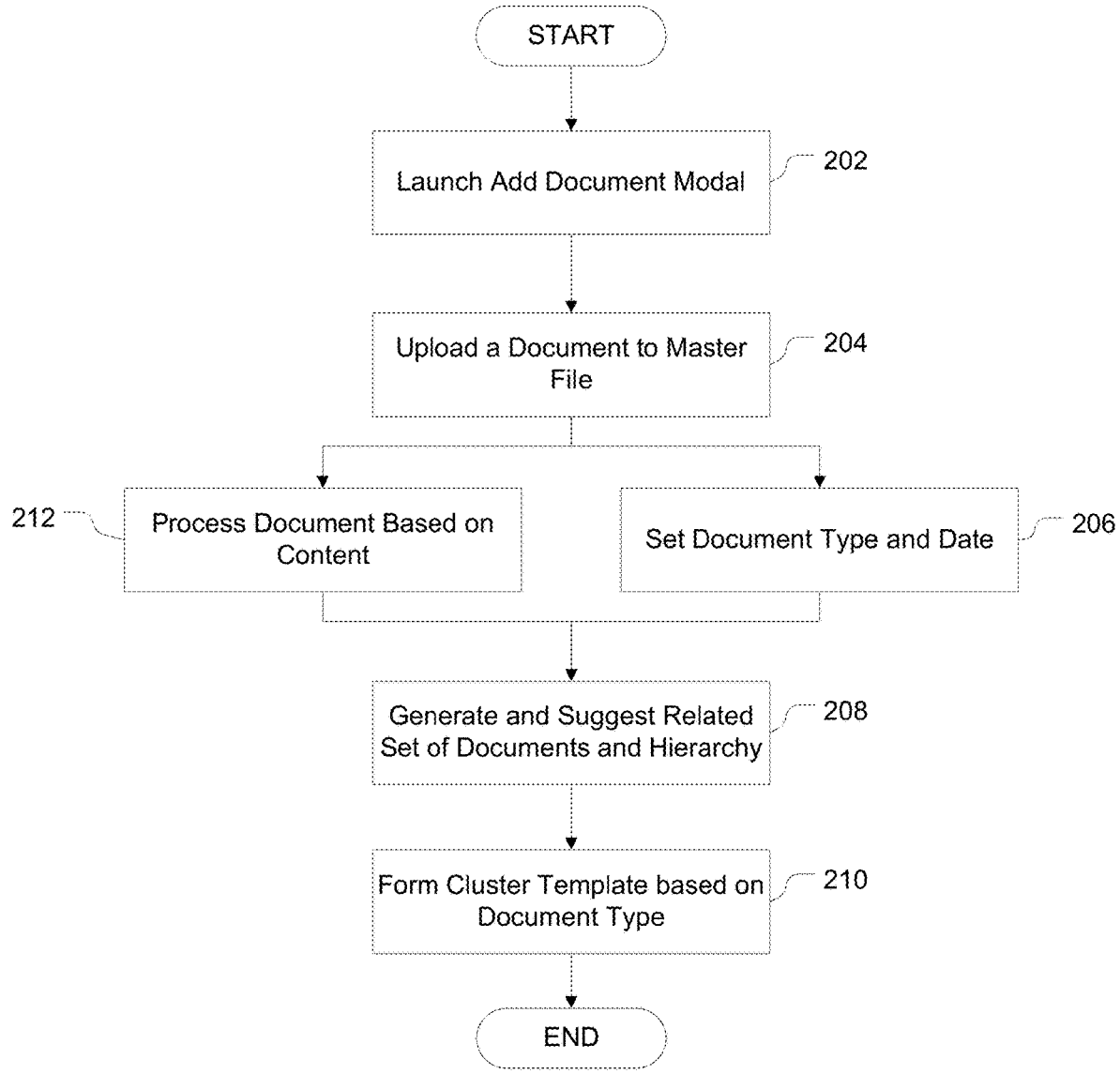
FIG. 2 is an illustration of the process of creating the Master File in accordance with one or more embodiments of the present invention.
Figure 3:
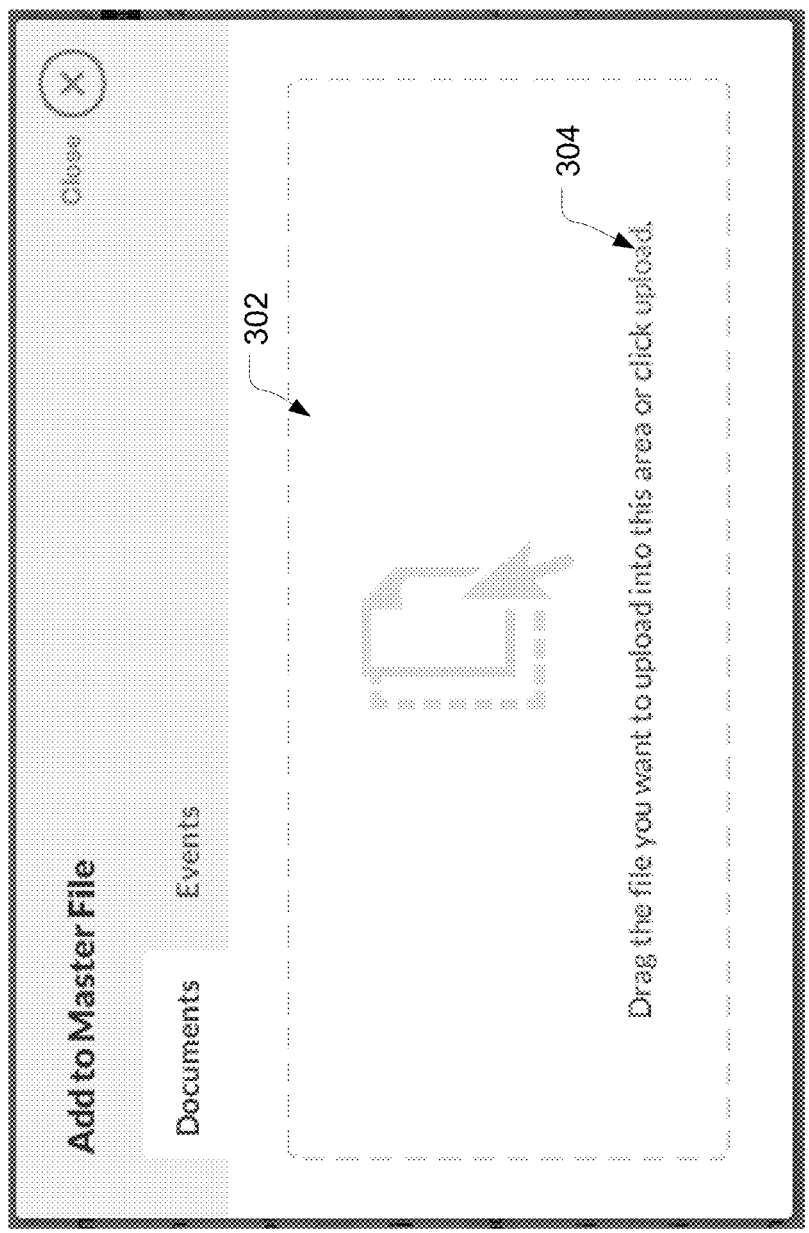
FIG. 3 is an illustration of the add document modal in accordance with one or more embodiments of the present invention.

FIG. 2 is an illustration of the process of creating the Master File in accordance with one or more embodiments of the present invention. To load a document to the Master File, the user launches an add document modal in step 202 and a dialogue box similar to that illustrated in FIG. 3, block 302, pops up. The add document modal lets the user upload a document to the Master File in step 204 using one of several file upload methods (e.g., by dragging the document into the modal 302, using the browser to select the file by clicking "upload" 304, or by bulk uploading multiple documents, etc.).

Figure 4:
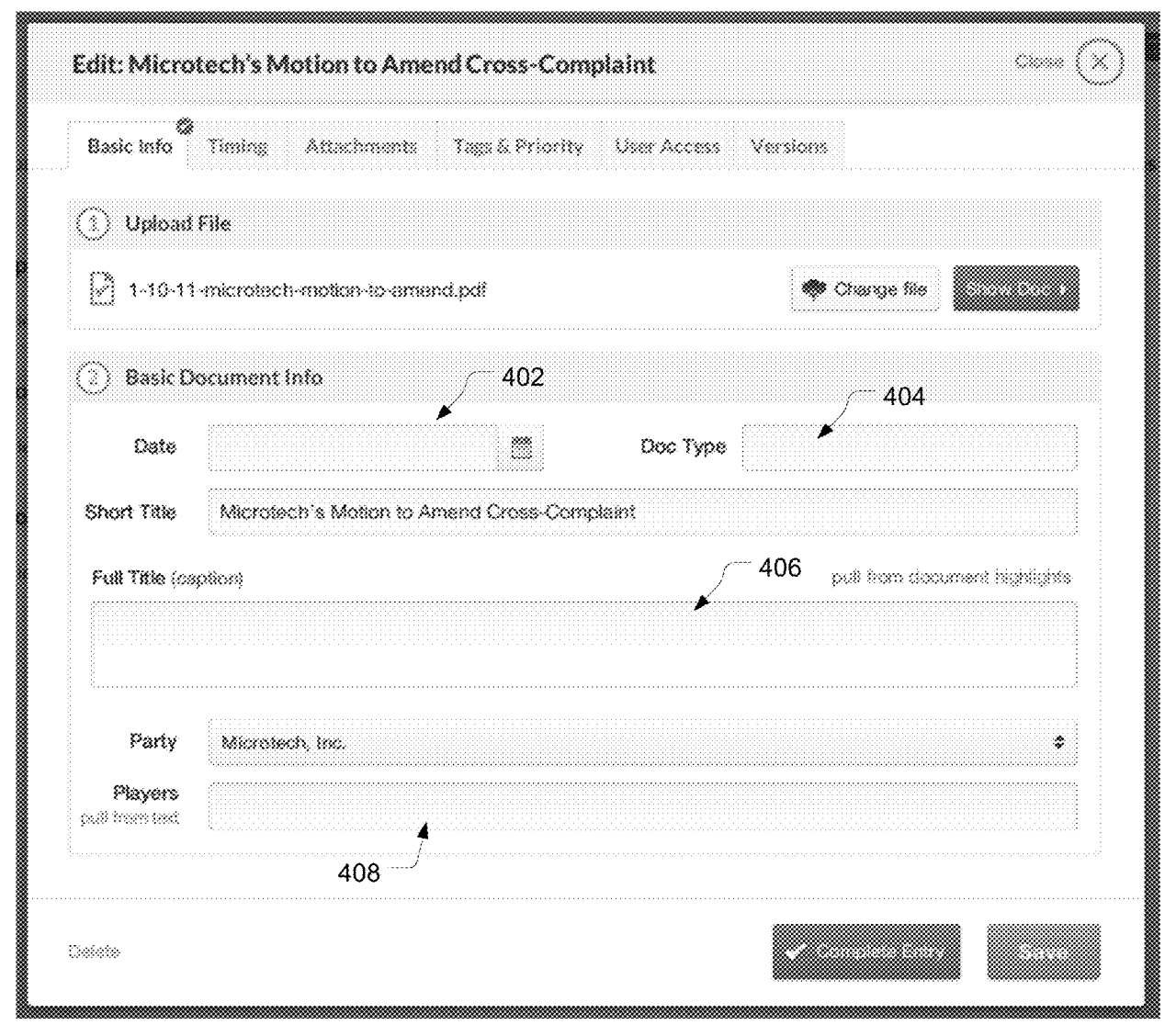

Once the document is added, a modal appears wherein the user may enter the document type and date in step 206. Simultaneously however, automatic processing of the document commences in step 212, which may result in auto-populating the document's metadata fields (e.g., type, date, Players, etc.). Setting or changing of the document type and date may be facilitated with a dialogue box, e.g., example shown in FIG. 4, which appears with fields for the user to enter the date of document (i.e., document loaded in step 204) in the Date field 402, to set the document type in the Document Type field 404, and to enter the full title of the document in the Full Title field 406. The user may also enter or change the Players (discussed below) in field 408. Based on the document type, the system will suggest the basic set of related documents and hierarchy and present the suggested set in the Timing tab, illustrated in FIG. 5. The user can also add fields beyond those suggested by the system. For example: if the document type is a motion, the document is assigned to a motion cluster template along with entries for opposition, reply, hearing, and order (the user can add a field for a sur-reply, for example); if the document type is a discovery request, the document is assigned to a discovery cluster template along with an entry for discovery requests and responses (the user can add fields for amended or supplemental responses, for example); etc.

In step 212, the document is OCR'd, and automatic processing is performed based on the contents of the document. Automatic processing includes the auto-population process described in detail below.

Once the date and document type are set for the Master File document, the system automatically generates a set of placeholders for related documents and hierarchy for the Master File document in step 208. The hierarchy and related documents are presented in the Timing Tab.

Figure 5:
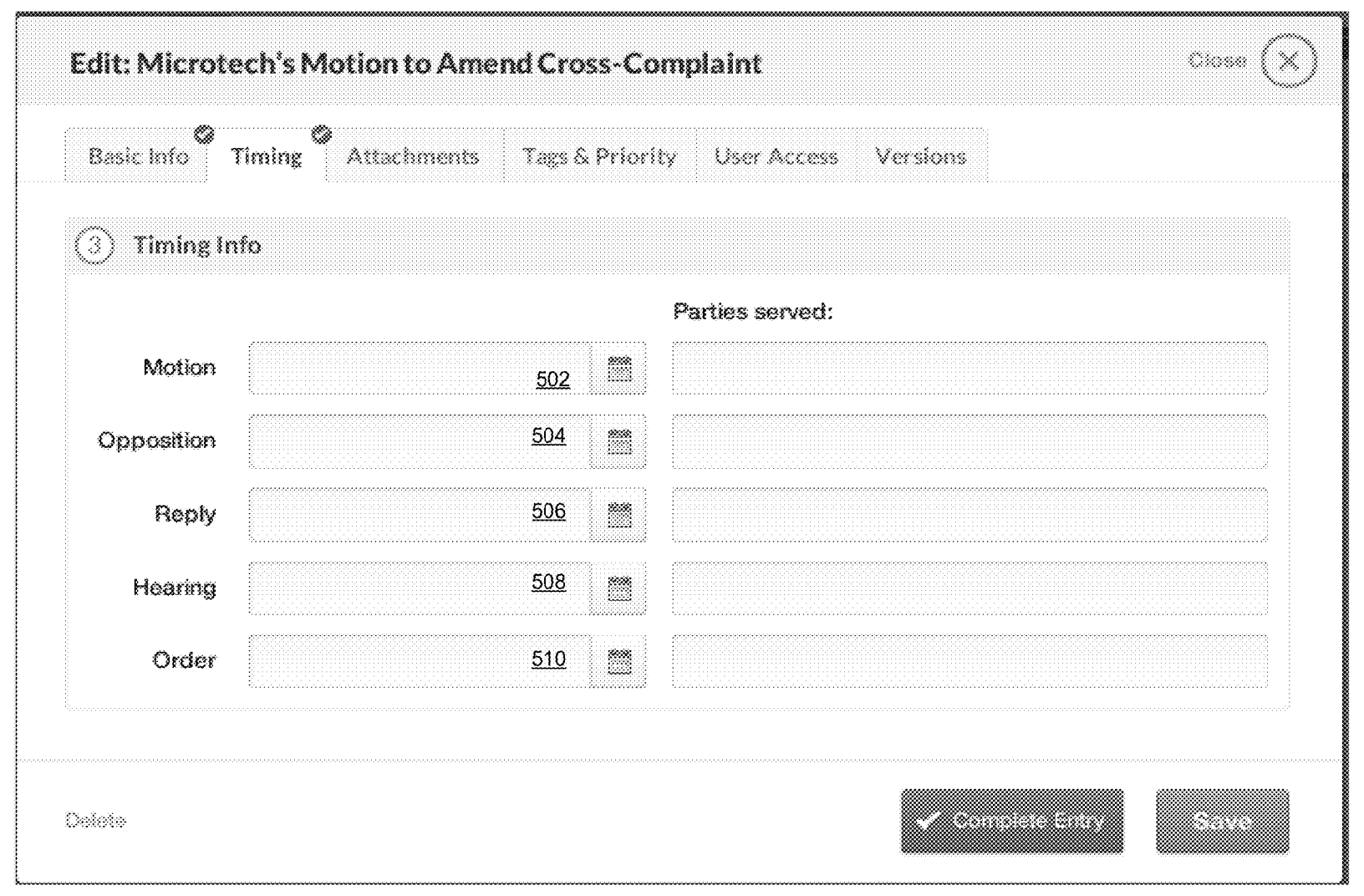

FIG. 5 is an illustration of the Timing tab in accordance with one or more embodiments of the present invention. In the Timing tab, the user can adjust the hierarchy and fields (e.g., remove, reorder, add custom fields, and so on). Once the hierarchy and the fields are set, the date fields 502 through 510 may be populated automatically (e.g., based on the procedural rules of the jurisdiction) and/or entered manually for each document in the Cluster. Also, the user may re-enter or change the date in each field. Date field 502 is for the Master File document, and thus may inherit the date from step 206. However, this date can also be changed along with any other data in date fields 504 through 510.

For every entry that receives a date in the Timing tab, a corresponding entry is created in the Calendar, which is related to the Calendar entry for the document being added.

Also, when a user adds the document, a cluster template is formed in step 210 based on the document type. The document being added has an entry in the Cluster. Other documents may be added to the entry to create a Family. Every other field in the Timing tab has a placeholder entry so that when the document is ready, users can click on the placeholder entry to upload the document corresponding to it or drag the document to the placeholder entry. If the corresponding document has already been added to the Master File, the system will add it to the placeholder entry or the user can drag it into the Cluster and it will automatically fill in the placeholder entry.

The system provides the user with the ability to edit the Master File's metadata. For instance, the user may edit a document's metadata, isolate incomplete or orphaned entries (entries that are not grouped in Families or Clusters), and organize the Master File (e.g., by assigning relations). In Edit Mode, the present invention splits up the screen where one half shows a filtered view with the entries that either need additional information or have not been related, or both, and the other half of the screen has the complete Master File. Using the split-screen, a user can then scroll through the Master File, get to the appropriate Family or Cluster in the Master File, and then drag the entry from the filtered side into the Master File.

Master File documents are the ones that shape the matter and are typically tied to important dates. These documents are typically related to other documents that came before, or they will command responsive documents in the future. As a result, in one or more embodiments, every document family in the Master File is tied to one or more Calendar entries. Placeholder entries are added as upcoming deadlines, and differentiated by whether they are for the party represented by the user or for the opposing party. Other documents may also be added that are not responsive documents but relate to the document entries in the Cluster. For example, with a motion Cluster, a user can add entries for meet and confer correspondence.

Family

A Family is a collection of documents that have some form of relationship. A user may create a Family by, for example, dragging one document to another, by selecting multiple documents and designating them as a Family, or similar method. The user can also bulk upload documents together as a Family. The user may arrange the documents in the Family in any manner desired. Usually, the Family Name and Family Type is based on the lead or top document in the Family. If a user reorganizes the Family in a way that changes this top document, the Family Name and Family Type changes based on the new top document. Every document has one or more metadata fields related to the document's Family, which indicate whether a document is in a Family and, if so, what Family. When a document is added to a Family, the field is populated with the Family info. When a document is removed from a Family, the field reflects that the document is not part of a Family.

Families play a very important role in organizing documents. For instance, assume a user filed a motion to dismiss. The motion was filed along with supporting documentation, which could include a declaration, with several exhibits, a proposed order, and a proof of service. The user would upload the motion to dismiss, the declaration, the exhibits, the proposed order, and the proof of service and add them to the Master File. The user can upload these as a Family or upload each document individually and combine them into one Family. The user would then organize the Family to make sure the motion to dismiss is the lead document and drag the exhibits onto the declaration to make them Attachments to the declaration. In one or more embodiments, the Family may be organized automatically by the metadata of the documents in the Family or by the user identifying the parent document, for instance. The Family Name and Family Type will be based on the motion to dismiss since it is the lead document. And as subsequent filings are filed—e.g., the Opposition, the Reply—the user will create similar Families for them.

A Cluster is a collection of Families. Clusters may be created using similar processes as those used to create Families. Families are usually arranged in a Cluster based on the Family Date and Family Type. The Cluster gets its name and type from the lead Family. The system will automatically relate responsive Families as Clusters. For example, if the system identifies that an opposition Family is responsive to a motion Family (e.g., using metadata, results of OCR), it will automatically join the Families in a Cluster. This process may be referred to as auto-relation and may occur during auto-population.

Associating the Family members with the Family lead ensures that the Family is always connected. The characteristics of the Family may be based on the characteristics of the lead document. In one or more embodiments, the characteristics of the lead document (or item) may be transferred to remaining members of the Family. Examples of document characteristics include document type, date and parties, etc.

For example, suppose a user is filing a motion. The user may also file supporting documents such as: declarations, a proposed order and proof of service with the motion. The user groups (i.e. associates) the motion and the supporting documents into a Family and identifies the motion as the lead document. In one or more embodiments, by associating (i.e. grouping) these supporting documents with the lead document, i.e. motion, one or more characteristic elements (e.g. attributes) of the lead motion (e.g. filing date, party, etc.) is automatically assigned to the supporting documents. These supporting documents become part of the motion Family thus enabling productivity enhancement functionalities, e.g. searching, e-brief, etc. For instance, a user can find a less prominent document (e.g. the supporting declaration) by searching for the more prominent document (e.g. the motion).

Documents may also be associated with parties and events. For example, association of a document with a witness. For instance, a deposition transcript of witness A. By associating exhibits with the deposition transcript, the documents are automatically linked with witness A in the system.

Events may also be included in an association. For example, assuming a deposition is created as an event and documents, e.g. transcript, the notice/subpoena and exhibits, are associated. In this example, the event will have a date and a witness, and the documents will be associated with that date and witness. These events become part of the Family thus enabling productivity enhancement functionalities, e.g. searching, e-brief, etc. For instance, a user can find a less prominent item (e.g. exhibit) by searching for an event.

Other characteristics of the lead document may include deadlines or event dates. For example, if a motion has a set hearing date, when the opposition or reply is associated with that motion, the hearing date will be associated with the opposition and reply families as well. Similarly, an entry for the hearing (an event) will be associated with all the briefs filed for the hearing.

In one or more embodiments, the group may be attributed a characteristic based on the relationship between the lead item and one or more other items in the group. For instance, a characteristic of "Pending" may be attributed to motion group when the Opening Brief, Opposition Brief, Reply Brief are the documents in the cluster, i.e. without the Order. And the characteristic may be changed to "Complete" when the Order is included in the cluster. Also, if the Order is granted, the system may apply a characteristic of "granted" to the family; however, if the Order is denied, "denied" is applied to the family, and so on.

Other non-limiting examples may include: Discovery such that when only the request is in group, the group is attributed with a characteristic of "pending," and changed to "complete" when the response is included; also deposition transcripts may be marked as "pending" or "incomplete" until the final/certified copy of the transcript is in the family.

The characteristic of the group may also depend on a predetermined sequence of document types. For instance, the system may be configured to attribute a characteristic to the matter items based on whether two or more of the matter items comprise such predetermined sequence.

Determination of the one or more of the characteristics attributed to the group may be based on the date, governing court rules, and one or more other characteristics of the lead item. For instance, based on the filing date, court rules, and one or more other characteristics of the lead item, the system may determine one or more deadlines for additional matter items that may be added to the group of documents.

This association provides the user with the ability to search for, locate and quickly retrieve particular documents in the Master File much more efficiently than other solutions. For example, if the user wants to find a document that supports a motion to dismiss—such as the key declaration in support of the motion—she can simply search for the motion to dismiss, expand the Family and access the declaration or any related document. With current solutions, the user would need a search hit on the title or filename of the less prominent document. Additionally, the system of relations reduces the need for manual organization and data entry. To create a similar structure in a typical files and folders system, a user would need to manually create and name a new folder for the cluster level and create and name a folder for the family level. If the user named the folder incorrectly, the user must edit the name of the folder. If the user named the parent document incorrectly, she must rename the file and the folder.

Automatic Document Linking

One or more embodiments of the present invention will automatically link citations in a document to the cited documents. In an exemplary embodiment, when a document is uploaded to the Master File, the system of the present invention will scan the document for citations or references to other documents, such as legal sources (e.g., cases, statutes, ordinances). For each citation in the document, the system will retrieve the corresponding authority from a legal research database and store it in a Research Library, for example. The system then converts the citations in the document to links to the authorities in the Research Library and when a specific excerpt or portion of a document is cited, the citations may be linked to that portion or excerpt of the document. For instance, if the document cites to a paragraph in the complaint or a declaration, or a specific discovery response, the cite will be linked to the document as well as the excerpt.

Also embodiments of the present invention use pin cites because they link to a specific page in an opinion to link to the specific page and text. For instance, if the citation includes a quote, it will highlight the quote in the cited document and if it is not a direct quote, embodiments of the invention may also try to match the language using fuzzy string matching to the approximate part of the opinion that is being cited.

Figure 6:
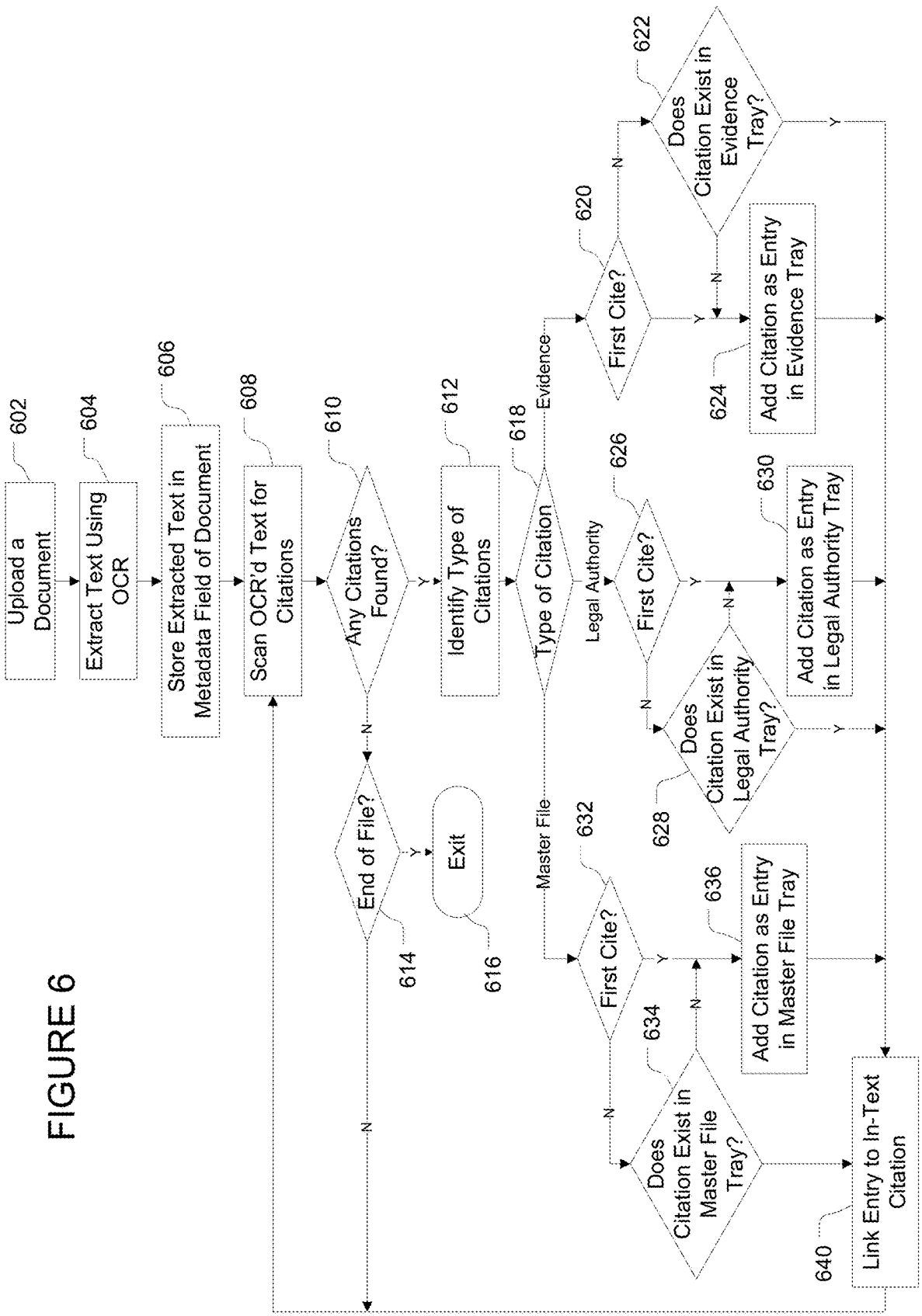
FIG. 6 is an illustration of the process of identification of citations in a document in accordance with one or more embodiments of the present invention.

Automatic Document Linking in embodiments of the present invention is illustrated in FIGS. 6 to 9. FIG. 6 is an illustration of the process of identification of citations in a document in accordance with one or more embodiments of the present invention. In general, each document in one or more embodiments of the present invention includes a template for documents which comprises the document and metadata fields. The metadata fields include, among other things, the OCR'd or embedded text and trays for citations to other documents, e.g., Evidence, Master File documents, and Legal Authorities. As illustrated in FIG. 6, a user uploads a document in step 602. The document may be uploaded by dragging the document into the add document modal, using the web browser to select a file, or any other convenient method. After the document is uploaded, the system performs text extraction using OCR on the document in step 604 and stores the extracted text in the metadata field in block 606, or recognizes any embedded text in the document. Using the results of the OCR process or the embedded text, the system processes the text to identify all citations to other documents and to populate the appropriate trays (e.g., citations to evidence are added to the Evidence tray) for automatic document linking.

The automatic document linking continues in step 608 where the system scans the text of the document for citations. In step 610, the system checks if it found any citations and if it did, it identifies the type of citation in step 612. Identification may follow a process such that if it finds Bates numbers, for example, it may assume the citation is evidentiary; if it finds notations that denote citation to a court or litigation document, it may assume it is to a Master File document (e.g., "Ex.," Tr.," "Decl."); and if it finds legal type citations, the system may assume they are citations to legal authorities; etc. Processing subsequently proceeds to block 618 to identify and populate the appropriate trays.

In block 618, if the type of citation is determined to be evidentiary, e.g., by finding Bates numbers, processing proceeds to block 620 to check if it is the first citation to an evidentiary document. If yes, the citation is added as a new entry in the evidence tray in block 624 and processing proceeds to block 640 where the entry is linked to the in-text citation. However, if in block 620 it is determined that the citation is not the first evidence citation, processing proceeds to block 622 to check if the citation already exists in the Evidence Tray. If no, the citation is added as a new entry in the Evidence Tray in block 624 and processing proceeds to block 640 where the entry is linked to the in-text citation. However, if in block 622 the citation already exists in the Evidence Tray, processing proceeds to block 640 where the entry is linked to the in-text citation. Thus, all subsequent evidentiary citations (i.e., after the first citation) are checked against the existing entries in the Evidence tray and if there is already an entry for the citation, the existing entry is linked to the in-text citation. However, if there is no entry, a new entry is created in the Evidence tray, which is linked to the in-text citation.

If in block 618, the type of citation is determined to be to a Legal Authority, processing proceeds to block 626 to check if it is the first Legal Authority citation. If yes, the citation is added as a new entry in the Legal Authority tray in block 630 and processing proceeds to block 640 where the entry is linked to the in-text citation. However, if in block 626 it is determined that the citation is not the first Legal Authority citation, processing proceeds to block 628 to check if the citation already exists in the Legal Authority Tray. If no, the citation is added as a new entry in the Legal Authority Tray in block 630 and processing proceeds to block 640 where the entry is linked to the in-text citation. However, if in block 628 the citation already exists in the Legal Authority Tray, processing proceeds to block 640 where the entry is linked to the in-text citation. Thus, all subsequent Legal Authority citations (i.e., after the first citation) are checked against the existing entries in the Legal Authority tray and if there is already an entry for the citation, the existing entry is linked to the in-text citation. However, if there is no entry, a new entry is created in the Legal Authority tray, which is linked to the in-text citation.

In one or more embodiments, the system uses the attributes of the Master File document to enhance the process. For instance, since certain Master File documents will have a table of authorities. The system may use the information in the table of authorities to quickly populate the Legal Authority Tray and then subsequently scan the document for the citations in the Tray and/or use the page cites in the table of authorities to help identify the citations.

If in block 618, the type of citation is determined to be to a Master File document, processing proceeds to block 632 to check if it is the first Master File citation. To check for Master File documents, the system scans the OCR results for citations to Master File documents. For instance, if the system finds notations such as "Ex.," "Tr." and "Decl.", it may assume it is a citation to a Master File document. If yes, the citation is added as a new entry in the Master File tray in block 636 and processing proceeds to block 640 where the entry is linked to the in-text citation. However, if in block 632 it is determined that the citation is not the first Master File citation, processing proceeds to block 634 to check if the citation already exists in the Master File Tray. If no, the citation is added as a new entry in the Master File Tray in block 636 and processing proceeds to block 640 where the entry is linked to the in-text citation. However, if in block 634 the citation already exists in the Master File Tray, processing proceeds to block 640 where the entry is linked to the in-text citation. Thus, all subsequent Master File citations (i.e., after the first citation) are checked against the existing entries in the Master File tray and if there is already an entry for the citation, the existing entry is linked to the in-text citation. However, if there is no entry, a new entry is created in the Master File tray, which is linked to the in-text citation.

From block 640 processing proceeds back to block 608 to continue the search for citations in the document until all the citations are processed and placed in the appropriate tray.

However, if in step 610 no citations were found and processing has not reached the end of the document (step 614), then processing returns back to block 608 to continue scanning through the document until the end of document is reached. Processing stops at block 616 when the end of file is reached.

Figure 7:
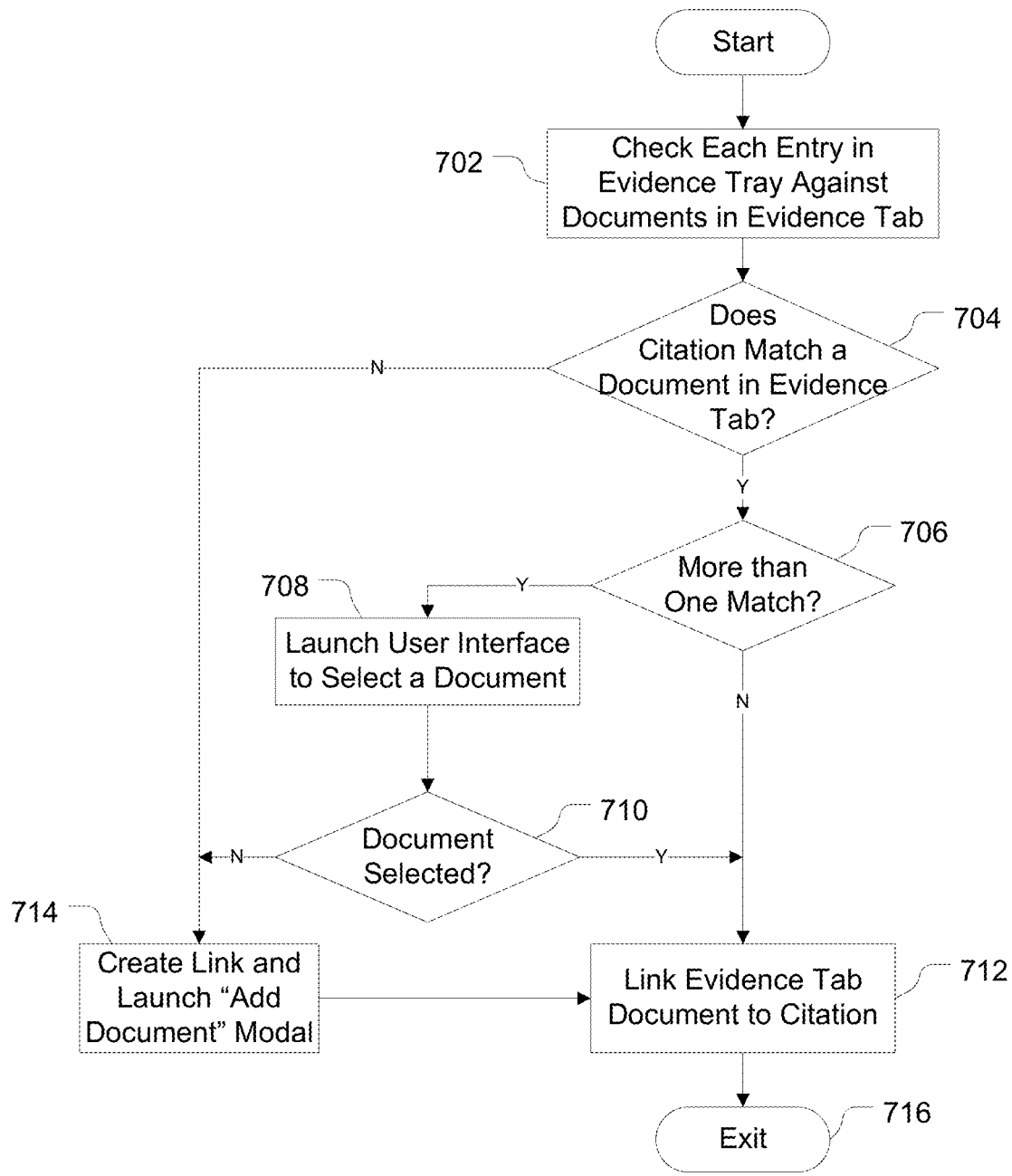
FIG. 7 is an illustration of automatic document linking to evidence citations in accordance with one or more embodiments of the present invention.

FIG. 7 is an illustration of automatic document linking to evidence citations in accordance with one or more embodiments of the present invention. As illustrated, in step 702, each entry in the evidence tray is checked against the documents in the Evidence tab. In step 704, if the citation in the Evidence tray matches a document in the Evidence tab, processing proceeds to step 706 to check if there is more than one potential match. If there is only one match, processing proceeds to step 712 where the document in the Evidence tab is linked to the citation in the Evidence Tray. Processing stops at step 716 once all the entries in the Evidence Tray have been linked to documents in the Evidence tab.

However, if in step 706, the citation in the tray indicates several potential matches, processing continues to step 708 where a user interface is launched indicating all the potential matches and the user is prompted to select from the potential matches. If there is a match, the user selects the proper document by, for instance, selecting the higher level document as the match. Once the higher level document is selected, the user can decide whether to use this for all future references to that document or if the system should check at each potential conflict. If the user selected a document as the match in step 710, processing proceeds to step 712 where the selected document is linked to the citation in the Evidence Tray. Processing stops at step 716 once all the entries in the Evidence Tray have been linked to documents in the Evidence tab.

However, if there is no match between an entry in the Evidence tray and documents in the Evidence tab in step 704, or if within the potential matches indicated by the system in step 708, the user indicates there is no match in step 710 (e.g., by not selecting any one of the documents suggested), the citation is converted to a link that will prompt the system to launch a modal (e.g., "Add Document" modal) allowing the user to manually upload the corresponding document to the Evidence tab in step 714. The manually uploaded document is added to the Evidence tab and linked to the citation in step 712. The system will also create a placeholder for the document in the Evidence tab, and the document can be added from the placeholder. The document can also be added directly from the evidence tray. Processing stops at step 716 once all the entries in the Evidence Tray have been linked to documents in the Evidence tab.

Figure 8:
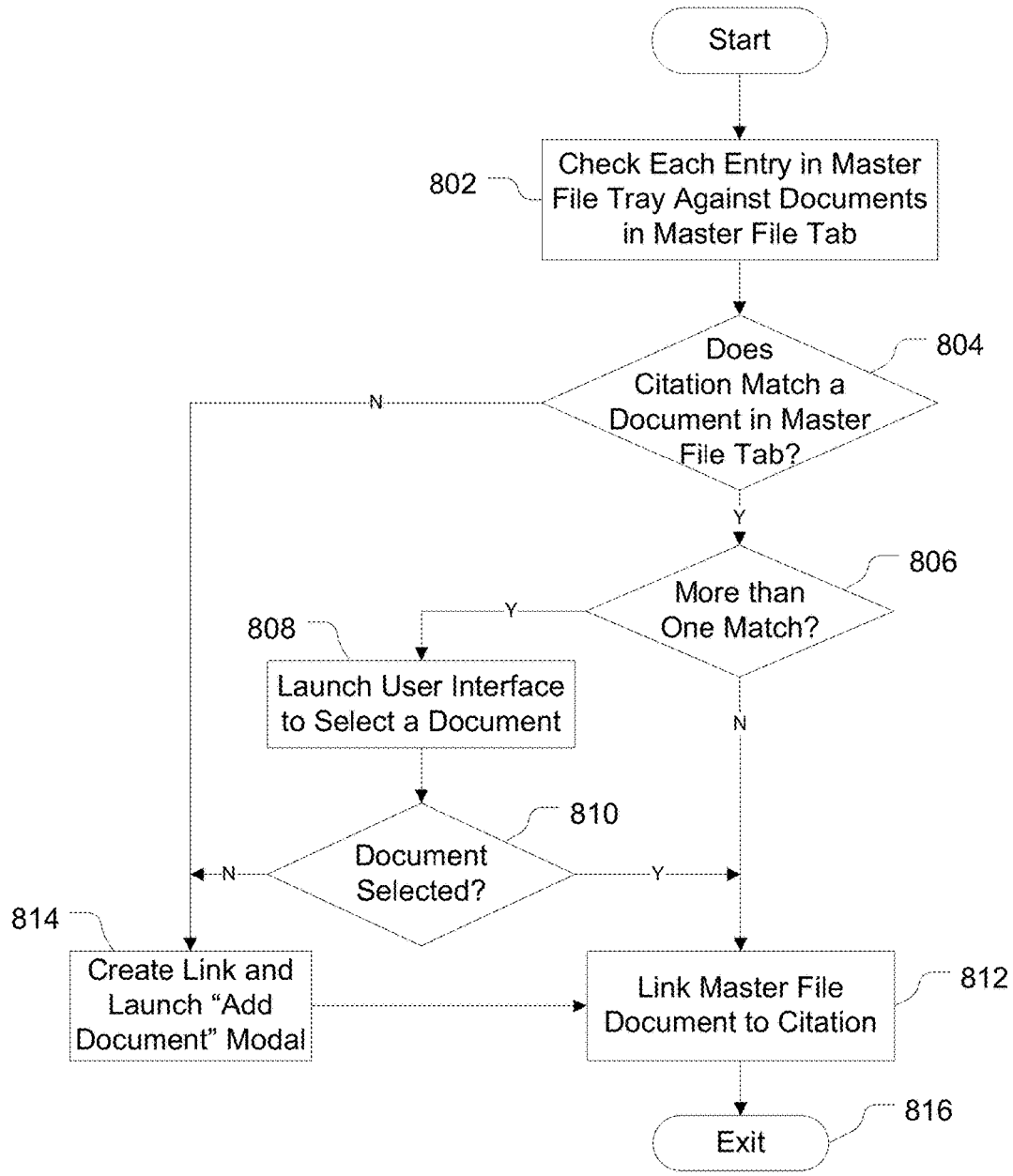
FIG. 8 is an illustration of automatic document linking to Master File citations in accordance with one or more embodiments of the present invention.

FIG. 8 is an illustration of automatic document linking to Master File citations in accordance with one or more embodiments of the present invention. As illustrated, in step 802, each entry in the Master File tray is checked against the documents in the Master File tab. In step 804, if the citation in the Master File tray matches the citation for a document in the Master File tab, processing proceeds to step 806 where a check is made if there is more than one potential match. If there is only one match, processing proceeds to step 812 where the document in the Master File tab is linked to the citation in the Master File Tray. Processing stops at step 816 once all the entries in the Master File Tray have been linked to documents in the Master File tab.

However, if in step 806, the citation in the tray indicates several potential matches, processing continues to step 808 where a user interface is launched indicating all the potential matches and the user is prompted to select from the potential matches. If there is a match, the user selects the proper document by, for instance, selecting the higher level document as the match. For example, suppose the document refers to Exhibit 5 of the Smith Declaration but the system finds four Smith Declarations with five or more exhibits (i.e., the system excludes any declarations with fewer than five exhibits). The user is prompted to select the appropriate Smith Declaration out of the four. The user can then indicate if all references in the document to the Smith Declaration should be linked to this same document, or if the system should prompt the user to identify the document for each subsequent reference to a Smith Declaration. Once the higher level document is selected, the user can decide whether to use this for all future references to that document or if the system should check at each potential conflict. If the user selected a document as the match in step 810, processing proceeds to step 812 where the selected document is linked to the citation in the Master File Tray. Processing stops at step 816 once all the entries in the Master File Tray have been linked to documents in the Master File tab.

However, if there is no match between an entry in the Master File tray and documents in the Master File tab in step 804, or if within the potential matches indicated by the system in step 808, the user indicates there is no match in step 810 (e.g., by not selecting any one of the documents suggested), the citation is converted to a link that will prompt the system to launch a modal (e.g., "Add Document"

modal) allowing the user to manually upload the corresponding document to the Master File tab in step 814. The manually uploaded document is added to the Master File tab (e.g., to the Family and/or Cluster of the original document) and linked to the entry in the Master File Tray in step 812. The system may also create a placeholder for the document in the Master File tab, and the document can be added from the placeholder. The document can also be added directly from the Master File tray. Processing stops at step 816 once all the entries in the Master File Tray have been linked to documents in the Master File tab.

Figure 9:
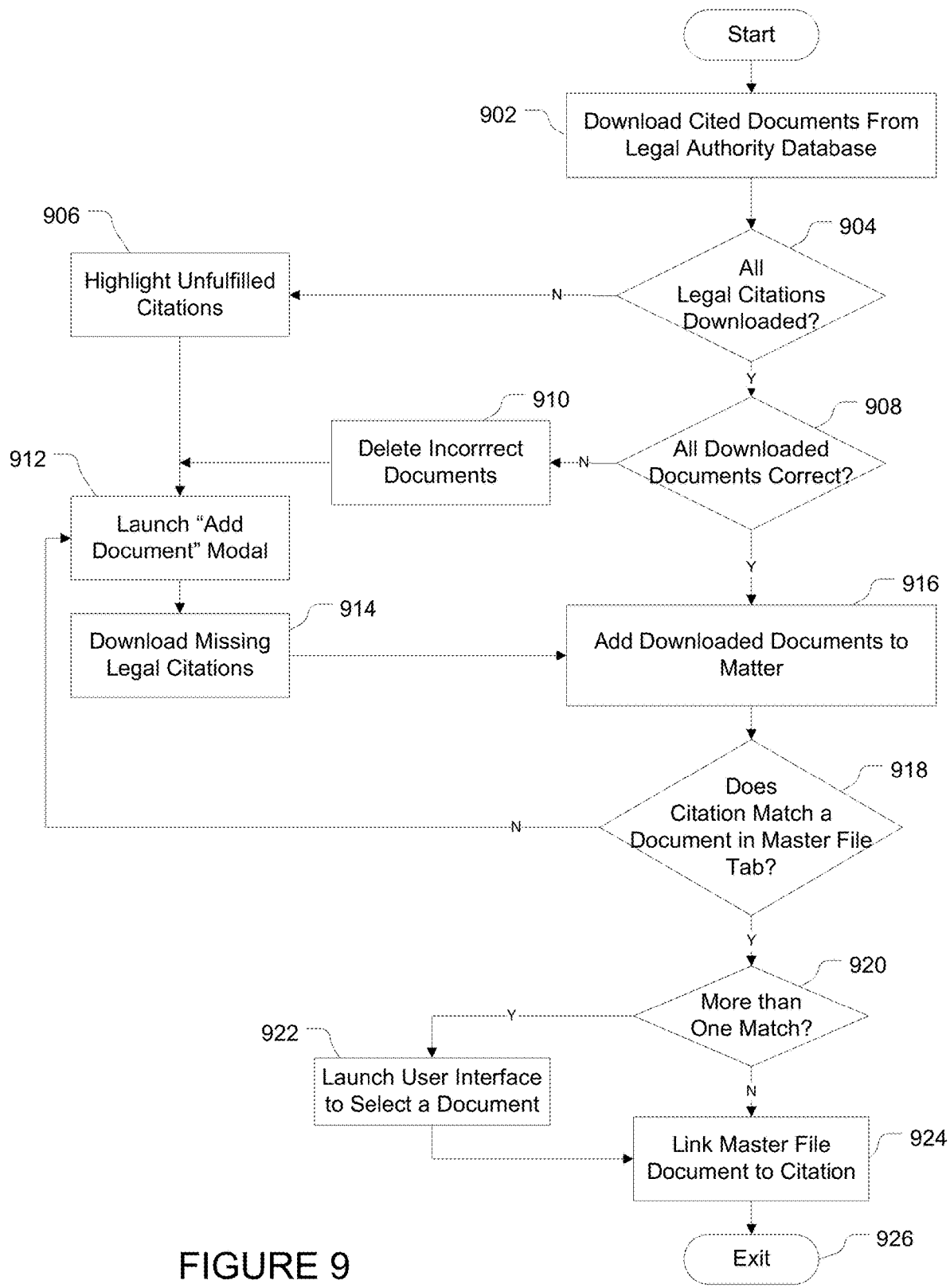
FIG. 9 is an illustration of automatic document linking to legal authority citations in accordance with one or more embodiments of the present invention.

FIG. 9 is an illustration of automatic document linking to legal authority citations in accordance with one or more embodiments of the present invention. The Legal Authority tray is preferably organized alphabetically by authority type (e.g., cases, statutes, etc.). In one or more embodiments, the system is able to distinguish original citations from subsequent citations of the same legal authority to minimize repeated downloading of the same legal authority. As illustrated, in step 902, when the tray is complete, the system pings a database of legal authorities and requests the documents corresponding to the citations in the tray. The system downloads these documents to a temporary storage (for example), to the extent available, from the database.

In step 904, a determination is made if all the legal citations have been downloaded. If yes, processing proceeds to step 908 where the downloaded documents are checked for correctness. And if all the downloaded documents are correct, they are added to the Matter (for example, to the Master File or Research Library) in step 916.

However, if in block 908, any of the downloaded documents is determined to be incorrect, processing proceeds to block 910 where the incorrect documents are deleted from temporary storage and a modal (e.g., "Add Document") is launched in block 912 so that the user can manually upload the correct document in block 914. Processing proceeds to block 916 where the downloaded documents are added to the Matter.

After the initial pull of the cited legal authorities 902, the user can manage the citations in the document for citations that were not retrieved from the legal database. For instance, if a citation is not retrieved in block 902 (as indicated by a determination in block 904), the citation is highlighted in block 906 to reflect that no corresponding document was found on the legal authority database. The system notes that an attempt to retrieve the citation was made and was unsuccessful. The user can click on the citation in the text or the tray and the system will launch a modal (e.g., "Add Document") in block 912 to manually upload the corresponding document in block 914. Once uploaded, the document will be added to the Master File or Research Library in block 916.

From block 916, processing proceeds to block 918 where each entry in the Legal Authority tray is checked against the documents in the Master File or Research Library tab. If the citation in the Legal Authority tray matches the citation for a document in the Master File or Research Library tab, processing proceeds to step 920 to check if there is more than one potential match. If there is only one match, processing proceeds to step 924 where the document in the Master File or Research Library tab is linked to the citation in the Legal Authority Tray and to the specific in-text citation. Processing stops at step 926 once all the entries in the Legal Authority Tray have been linked to documents in the Master File or Research Library tab.

However, if in step 920, the citation in the tray indicates several potential matches, processing continues to step 922 where a user interface is launched indicating all the potential matches and the user is prompted to select from the potential matches. The user selects the proper document by, for instance, selecting the higher level document as the match. Once the higher level document is selected, the user can decide whether to use this for all future references to that document or if the system should check at each potential conflict. If the user selected a document as the match in step 922, processing proceeds to step 924 where the selected document is linked to the citation in the Legal Authority Tray. Processing stops at step 926 once all the entries in the Legal Authority Tray have been linked to documents in the Master File or Research Library tab.

However, if there is no match between an entry in the Legal Authority tray and documents in the Master File tab in step 918, the citation is converted to a link and the system launches a modal (e.g., "Add Document" modal) in block 912 allowing the user to manually upload the corresponding document to the temporary storage in step 914. The manually uploaded document is added to Master File or Research Library tab in step 819. Processing proceeds as discussed above until all the citations in the Legal Authority tray have been processed.

Also, if a legal authority was not pulled from the legal database in block 902 because the citation was incorrect when added to the tray (e.g., due to poor OCR), the user can edit the citation in the tray to correct it. The system will retrieve the document with the corrected citation from the database of legal authorities. If the document with the original, incorrect citation was added to the system, it will be deleted and replaced by the document retrieved with the correct citation.

For citations that were not originally identified in the document (e.g., due to OCR issues), the user can manually select the citation in the document and click on "add citation" to add it to the tray. The user can edit the entry in the tray to reflect the accurate citation (if necessary). The system will retrieve the correct document from the legal authority database and upload it automatically, or the user can manually upload the document or link the cite to a document already in the Matter.

After all the cited documents are linked, one or more embodiments of the invention provides for generating the linked document ("e-Brief") for production. In one or more embodiments, the document is converted into a PDF consisting of the main document (e.g., a brief) with each citation converted to an active hyperlink (which links to the document corresponding to the citation later in the PDF) and followed by each of the documents cited in the main document.

Syncing the Master File with an Electronic Court Docket

A growing number of courts in the country now have electronic dockets that allow the parties and the court to file and retrieve court documents electronically. For example, the federal court system offers the ECF/PACER system (see http://www.pacer.gov). Many state courts have similar services. Currently, to retrieve a document from an electronic docket, the user has to manually log in to the docket, locate their case, locate that case's docket, locate the document they would like to download and then manually download the document and save it.

The present invention provides a method to sync a Matter's Master File with a court's (or any other governing body's) electronic docket. In other words, the system will ensure that any document filed electronically will be added to the Master File for the synced Matter. For example, if a party files a motion with the court or the court files an order, the invention will pull in the document from the docket and add it to the Master File. The invention will also pull in available information about the document to populate the document's metadata.

Using the invention, the user can also pull everything that is on a court's docket and have it added to the Master File. For example, suppose a party is added to a litigation as a defendant two years into the case. As a result, when the party joins the case there would be a good amount of documents already filed with the court and in the electronic docket. The attorney representing the party could sync a Matter with the court's docket, and, with one click, request that the system pull every document from the docket and add it to the Master File. The system will grab every document from the docket, along with related data for each document, and add each document to the Master File as a separate entry.

This feature also interacts with the autorelation component of the invention discussed in more detail below. To the extent documents pulled from an electronic docket are related, the system will automatically relate the documents—e.g., as attachments, Families or Clusters.

Document Management & Analysis

One or more embodiments of the present invention provide an evidence component that enables users to build a powerful and interactive chronology, which contains entries for key items, such as documents and events. This is accomplished by tying every entry to an item, such as a document, and its associated metadata. Also, any discussion or comment about the item is tied to it and can be easily accessed from the entry. The invention also provides graphical timeline representation of the items in the chronology and various tools to manipulate the timeline.

Users can upload or link to data sets and overlay the data on the items in the chronology. For example, in a securities litigation involving a particular stock, a user can overlay the stock price on the documents in the chronology. Each document will be tied to the stock price on that day. A graphical representation will show the user how the price for that day compares with the stock price before and after.

Embodiments of present invention also include a social media management tool that allows users to meaningfully organize, link and analyze social media. For example, using location data tied to social media items, users will be able to depict the chronology of events and documents over time and space.

In one or more embodiments of the present invention, items in the system can be viewed in a table. The table has a set width. The columns have two organizational components: The first component is a set of fixed columns with attributes that can be used to identify the item in the row. For example, for a document, these can be the date, the document type, and the document subject or title. The second component consists of several sets of columns of related attributes. The user can choose which set of columns to display in this second component. As the user swaps one set of columns for another, the first component stays anchored. This allows the user to always know exactly which item is represented by a particular row. In one or more embodiments of the invention, the user will have tabs, buttons, or links representing each set of columns. When the user clicks on a particular tab, button, or link, the columns related to that tab are swapped in for the second component.

Events

Though it is common to think of evidence in terms of documents—such as the iconic "Exhibit A"—evidence may not always be captured in a document. Rather, an event or occurrence could be significant. For example, the parties in a dispute had an important meeting—there was no recording of what happened, but the parties recall what happened. The present invention allows users to create Events to capture this type of evidence.

In addition to capturing key descriptive information about the Event—such as date, title, location, attendees—it is important for attorneys to track the source or basis of an Event. For example, an Event's existence may be based on a discussion with a client or a witness, a news source, or a document that refers to the event. Examples of such documents are calendar entries or reminders, securities filings and deposition transcripts. In a deposition, a witness may be examined about a particular occurrence and her testimony could be a source or basis for the Event. With the present invention, users can associate a source or multiple sources with an Event.

In one or more embodiments of the present invention, users can link Events and source documents. For example, if the source for an Event is a portion of a deposition transcript, the user can select the relevant portion of the transcript and associate it with an existing Event or create a new associated Event.

In some instances, an Event will have multiple sources. For example, suppose the plaintiff and the defendant had an important meeting. Each one gets deposed and examined about the meeting, and each provides their side of the story that is reflected in their deposition transcript. With the present invention, the user can associate the relevant portion of each transcript with the same Event.

The present invention also links the annotation in the source document with the Event. Commenting in the annotation is ascribed as a comment to the Event.

Players

A Player is a person or entity that is relevant to a particular matter. For example, a Player may be a party, a witness, a custodian of documents, etc. The Players List feature of the present invention enables the team to manage information and intelligence about the people and entities (i.e., Players) that are relevant to the Matter.

Every Player has an individual profile that is automatically linked to every item associated with the Player. For example, an item in Evidence related to the Player, either in the metadata or in the text, is linked to the Player. The present invention will also link portions of documents in the Master File that mention the Player by name or alias. For example, if certain discovery responses or deposition transcripts mention the Player, those items will be associated with the Player. This is important because a Player may not be referenced in a metadata field but happens to be mentioned or discussed in the body of the document. An attorney would want such a document included in the Player's witness file. The Player profile links to the items related to the Player.

With the Players List, users can conduct analyses and generate Reports related to one or more Players and their related items. Players and their relationships with other issues and Players may be depicted visually to aid in the analyses. For example, with embodiments of the present invention it is possible to create visual representations that depict a Player and their interactions with other Players. Users can analyze these interactions based on occurrences, timing, issues, and other elements.

Authentication

A user can access a listing of the documents that any Player can authenticate and has authenticated, can generate a Report with the documents that a Player can authenticate or with the documents the Player has authenticated along with the corresponding deposition excerpts authenticating the document.

Users can track whether a document in evidence has been authenticated by a Player. Every document added to Evidence in the present invention has several metadata fields related to authentication, including whether or not the document has been authenticated, which Players can authenticate the document, which Player or Players have authenticated the document (if the document has been authenticated), the method of authentication, and an excerpt from the transcript of the Player authenticating the document.

Discovery Tools

In one or more embodiments of the present invention, if the Master File document is written discovery, a tool specific to managing, linking and analyzing written discovery can be launched. For example, the tool provides for unitizing, capturing and linking individual requests and responses in written discovery. As units, these requests and responses can be annotated and tagged, as well as linked to other documents, such as motions to compel. Users can also generate reports separating the requests and responses along with any annotations and tags. The system will automatically unitize written discovery requests and responses, and link individual requests to corresponding responses, as well as amended and supplemental responses.

The system also includes a production tracker for tracking productions of documents in discovery. The production tracker contains entries for each production and clawback made in the matter. Each entry may include fields of data, such as date of the production, party making the production, production volume, etc. Documents, such as cover letters, can be associated with the relevant entry. Evidence documents with Bates numbers are automatically checked against the production tracker and tied to the appropriate entry with the production containing the document. Users can also add privilege and redaction log entries to the chronology as items. Redaction log entries can be automatically tied to documents in the chronology.

Video and Transcript Management

One or more embodiments of the present invention also include tools to manage and link transcripts and videos. For example, users can highlight, tag or annotate portions of the transcript and these selected portions will be tied to the corresponding part of the video. Users are able to generate interactive reports that show the selected portion of the transcript along with the corresponding snippet of the video. Users are also able to link exhibits to the portions of the transcripts where the exhibit is discussed. The document will then be tied to that portion of the transcript. Users can generate presentation slides (e.g., PowerPoint) with tear outs for the selected text and add the corresponding snippet of the deposition video.

Text Message Management

One or more embodiments of the present invention provide for management of text messages. In a typical litigation, raw texts are produced in a load file, where each text is a separate database entry with a corresponding TIFF, or extracted to an Excel spreadsheet with each row corresponding to a text. In a preferred embodiment, the raw texts are automatically converted to a table where each row represents a single text. The table includes one column for the number sending the text and one column for the number receiving the text. If this number has been associated with a Player in the case, the cell is populated with the Player's name instead of the number. The table may also have the date and time the text was sent, and the content of the text.

The user can then select the rows (texts) that make up a conversation to form an "exchange." Once rows are combined into an exchange, the rows gray out to indicate inclusion into an existing exchange. Those of skill in the art would appreciate that it may be desirable to prevent the grayed-out rows from being selected and used to form separate exchanges. The user can also choose to hide or show rows that have already been incorporated into an exchange. If the user later finds another text that belongs in an exchange, the text can be dragged into the exchange to add it. The user can also filter the table to only show texts exchanged between two numbers. The system can automatically deduplicate (e.g. remove duplicate) texts between the same numbers or identify potential duplicate texts for merging. The system may also automatically merge identical texts sent to different people. For example, if one person sends a text to five people, it will be reflected as five different raw texts. Embodiments of the invention will merge these into one entry with one sender and five recipients.

Exchanges can be added to the chronology in the Evidence tab. An exchange has its own card or entry displaying the exchange. An exchange can be tagged, annotated, searched and filtered as with any other document on the system. The entry tracks the Bates number(s), confidentiality designation(s), and any other specific information associated with the texts in the exchange.

Feed

In one or more embodiments, collaboration on an item may start by a user creating a post and adding the item (e.g., a document) to the Feed. Prior to posting, the user may choose where to direct the item (e.g., Evidence, Master File, Research Library) or the system will use the results of the OCR to determine the location. Thus, for instance, if it identifies a Bates number, it will send the document to Evidence; if it identifies a caption page or a footer of a litigation document, it will send the document to the Master File; and if it identifies an opinion, it will send the document to the Research Library. The user can also choose to add metadata to the item at this stage. The user may then post the item to the Feed with or without a comment. The system then automatically adds the item to the selected location (i.e., Evidence, Master File, or Research Library) and if any metadata was entered, it is associated with the document. Also, if a comment was included with the post, it is added as a conversation to the document.

Users can use the Feed to post items to the team. Users can post items like comments, documents, files, events, deadlines, and tasks. Users can interact, discuss, highlight, search, and archive items in the Feed.

Highlighting a post sets the post apart from the other items in the Feed. Other users with access to the post can see that it has been highlighted. Feed items that have been highlighted may float or rise to the top of the Feed or to a separate area of the screen. Users are then prompted to address the item before sending it back into the feed. Users can also filter the Feed to show only highlighted posts.

In one or more embodiments of the present invention, items posted to the Feed are automatically sent to the appropriate bucket along with any associated metadata and work product. For example, if a user posts an evidentiary document to the Feed, it is automatically added to the Evidence tab with all associated metadata.

Posts can be directed to preset and custom distributions, or to specific users, such that only users that are part of the selected distribution or specifically addressed can view and interact with the posts.

A docket tracking feature synchs a Matter to its electronic docket (e.g., PACER). Users can get updates directly to the Feed when a document has been filed with the court or served on the other side. These documents will automatically be shared with the users on the Matter when filed and added to the appropriate location along with available metadata.

Discussion and Messaging

Users can share documents and discussions from the present invention, and message or chat with other users. Users can drag any item in the present invention into another window to create a link to the item. This link can be sent as a chat or direct message in the present invention, or in any other program, such as email. It can also be embedded into any document that can capture text (e.g., dragging the item into a Word document). Users can drag items to other locations in the present invention to share them (e.g., chat windows, comment boxes).

Users can chat with one or more other users in real time on any device. A user can drag any item in the present invention into the chat window, and the present invention will convert it to a link to that item. The user can then send that link to the person she is chatting with who will now be able to navigate to the item represented by the link. Also, the user can send a link to the view she is looking at. The person on the other end of the chat can then quickly get on the same page and view the exact same thing. A person that is online can be pinged, if it is desired to enter into a chat with that person. The person will be notified along with a link that would launch them into a chat with the pinging user.

In one or more embodiments, the invention may enable users to chat with one another or with multiple users simultaneously. A user can drag any object in the invention (e.g., a document entry, a Player profile, a saved search) to the chat window to share it with another user or users involved in the chat session. In one or more embodiments, the invention converts the dragged object to a link to that object in the chat window. The other user(s) involved in the chat session may click on the link to view or access the shared object. This makes it very easy to collaborate, as it allows users to quickly share exactly what they want to discuss.

Calendar

The Calendar enables the team to manage events, deadlines and tasks. Users can assign metadata to Calendar entries and one or more embodiments of the present invention will create and link related entries based on the metadata. For example, if a user adds an entry for a motion, the Calendar will automatically create later and linked entries for the briefing schedule and hearing. Similarly, if the user creates an entry for a deposition, the deadline by which the deposition transcript must be reviewed is created. Users can also link to entries manually.

Users can link entries in the Calendar to other items (e.g., Evidence, Master File, Research Library), as well as other Calendar entries. This includes individual items, like documents, or collections of items, like work files. The Calendar entry features a link to the related document. For example, a user can link an entry for a meeting with a work file containing the documents relevant to the meeting. Users invited to the meeting can access the work file through the link associated with the Calendar entry.

As discussed above, the Calendar synchs up with the Master File. Items added to the Master File and expected response dates or events are reflected in the Calendar. Similarly, when a user creates an event in the Calendar, a corresponding entry may be created in the Master File.

The Calendar also has tools to manage workflow related to a particular task or assignment. Users can set multiple tiers of activity for a particular task. Using this workflow, each subsequent user can review or work off of what the prior user did. For example, a junior associate is assigned the task of creating the initial draft, the senior associate is assigned the task of revising it, the partner is tasked with a final review, and then finally the client receives the final version. Once a user indicates that her stage of the workflow is complete, the next user in line receives a notification to initiate their part of the task, along with a link to the relevant item (e.g., the latest draft). Users can also isolate unassigned deadlines and tasks and view how tasks have been allocated across the team to assist in managing workload for a matter.

The Calendar also provides capability to perform group evaluation. The group evaluation feature allows for an item to be evaluated by multiple people without them seeing what the others concluded. For example, a user can send work product to the select members and invite them to provide their evaluation. Only the user requesting the evaluation has access to the invitees' comments, edits or suggestions. The requester can subsequently choose to reveal the evaluations to the team. A user can also seek a blind evaluation, where the people submitting the evaluations are made anonymously and the requester cannot see their identities.

Through the Calendar, users can invite vendors to attend or compete for a particular event. For example, for a scheduled deposition, a user can invite a vendor to provide court reporting and videographer services. The vendor can confirm their attendance and provide pricing information or an invoice. A user can access the vendor information from a shared contacts directory or from a broader, public directory. The user can also invite multiple vendors to ensure availability or compare pricing, and ultimately choose and schedule one to attend.

Print to Cloud

Print to Cloud allows a user to send a document, along with metadata, from any application to any Matter in the database, and automatically store the document in the appropriate location (e.g., Evidence, Master File, and Research Library). The user can also choose to share the document with a particular feed distribution—with or without a comment; enter metadata related to the document (e.g., date, document type, associated players, subject, description); and apply tags to the document.

The mechanism is the Print to Cloud print driver that the user can install. Once installed, the Print to Cloud print driver will be available as a printer option accessible from any application. From the initial print dialog, the user is given standard print options and settings (e.g., setting the page range to print, orientation, etc.). The user can also (a) choose what Matter to send the document to, (b) choose the location to add it to (e.g., Evidence, Master File, Research Library), (c) choose to share the document with the Feed (and add a comment), and (d) enter in some basic data for the document, including: Date, Document Type, Player Names (To, From, CC, Author), Subject, Description, Tags. The user then selects send in the dialog box to "print" the document to the desired location.

The print instruction causes the document to be added to the Matter and location specified by the user, the metadata entered and tags applied are associated with the document (e.g., a document card is created for the document as if you added the document directly from the system), and if the user chose to post the document to the Feed, the document is posted to the Feed, available to the selected distribution, along with the user's comments.

Confidentiality Designations

One or more embodiments of the present invention provide access for users to set confidentiality designations that correspond to particular user classes (e.g., in compliance with a Protective Order in litigation). These designations can then be applied to documents or document portions, either manually or automatically. Users can only access documents or document portions with designations that are accessible to their user class (e.g., documents designated as "outside counsel's eyes only" cannot be seen by client users).

Auto Population

In one or more embodiments of the present invention, one or more of a document's metadata fields are automatically populated once the document is loaded into the system of the present invention. The document may be a Master File document, an evidentiary document, etc. The caption page is the first page of the typical Master File document. This includes documents that are filed with the court—like pleadings, motions and applications—and documents that are served on parties—like interrogatories, requests for production, and requests for admission. The table below and FIGS. 10A-D provides the typical types of information found on a typical caption page and the metadata fields wherein these items could be mapped. One or more of the fields could also be mapped to the Matter Profile, preferably the first time the operative pleading (e.g., complaint) is uploaded or the Case Directory.

plaints, the causes of action are broken out in a numbered list (e.g., as illustrated in FIG. 10B).

Also, the signature page can be identified and potential metadata information extracted therefrom. The signature page is typically the last page in a Master File document, but not always. As illustrated in FIG. 10C, the signature page can be identified when, for instance, a page other than the caption page contains the phrase "Attorney for" or "Attorneys for", the page contains the phrase "Respectfully submitted", the page contains the phrase "Dated:" (e.g., 1016), contains an actual signature or an "/s/" in the signature line, or combinations thereof.

In one or more embodiments, acquiring the data for auto-population depends on the field being populated. For instance, the Full Title field may be populated based on results from a keyword search. The System searches the caption page for the first instance of any of the appropriate keywords (e.g., Complaint, Answer, Stipulation, Notice, Motion, Request, Reply, etc.) and it locates a keyword. Everything in the sentence or paragraph containing that keyword is considered the full title, e.g., 1008 and 1013. In cases, where there are multiple instances of these keywords on the page, the system identifies the caption as the instance closest to the top of the page. The system then populates the Full Title field with the entire full title from the caption page.

Populating the Short Title Field is based on the caption page footer. This may be accomplished, for instance, by

| Information Item | Description | Example Mapping |
| --- | --- | --- |
| Title of the Document (e.g., 1008) | The full title of the document. For example, "Motion for Summary Judgment" or "Plaintiff's First Set of Requests for Production." | MF - Full Title/Caption field |
| Footer (e.g., 1012) | Typically contains an abbreviated title for the document | MF - Short Title field |
| Attorney & Firm Info (e.g., 1002) | The name(s) of the attorney(s) and firm(s) or entities (e.g., US government) representing the party filing or serving the document, including the contact information and state bar numbers for the attorney(s). Some jurisdictions require this info in the signature page and do not include it on the caption page. | MF - Players |
| Party Info (e.g., 1004) | The party's name and type (e.g., plaintiff, defendant, cross-complainant) is typically found under the attorney/firm info block in the form "Attorneys for [Party Type] [Party Name]." | MF - Party field |
| Court Information (e.g., 1006) | The name and location of the court, as well as info about the judge. From this you can determine if the case is in federal or state court. | |
| Title of the Case (e.g., 1005) | This is where you list the parties on either side of the "v." - plaintiff(s) first and then defendant(s) on the other side of the "v." The caption page lists every party in the action, assuming there are multiple parties. | |
| Case Number (e.g., 1007) | The number the court uses to identify the case in its docket. | |
| Hearing Information (e.g., 1010) | When the document relates to a hearing, such as a motion, opposition, or reply, you typically include the date, time and place of the hearing. | MF - placeholder for hearing Calendar - entry for hearing as event |
| Document Number (e.g., 1014) | The number the firm uses internally to identify the document on its document management system (DMS) | MF - Document Number field |

Figure 10A:
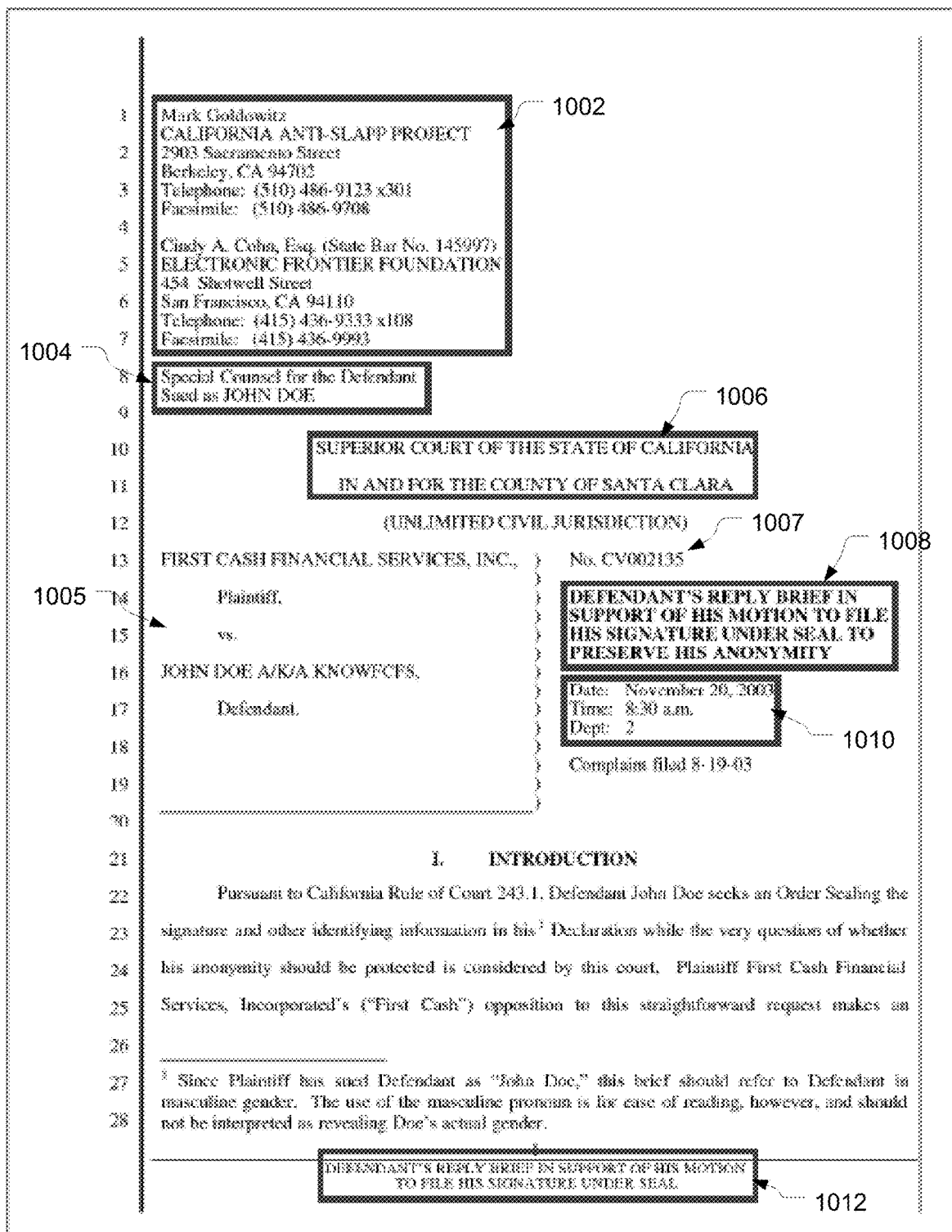

Obtaining metadata field information from a document is based on certain known and presumed attributes for the type of document. For instance, as illustrated in FIG. 10A the Full Title of the Document 1008 is usually located on the caption page, highly likely to be in ALL CAPS (in the rare cases where the caption is not entirely in ALL CAPS, it will be a mixture of ALL CAPS and sentence case (e.g., as illustrated in FIG. 10B, 1013)), likely to be bolded, and most likely to be a continuous sentence, paragraph, or block of text on the caption page. However, in some documents such as com-locating and capturing the caption page footer, and populating the Short Title field with the captured string.

Populating the Party Field may be based on keywords. For instance, the system searches the caption page, FIG. 10A, and signature page, FIG. 10C, for the phrase containing the following keywords "Attorney for . . . [Party Type] [Party Name]" or "Attorneys for . . . [Party Type] [Party Name]." The system parses the phrase to isolate the Party Name and Party Type and populates the Party Field with the Party corresponding to that Party Type (as reflected in the Matter Profile). Special rules may be followed in cases where there are multiple parties. For instance, if there are multiple parties of that Party Type (e.g., multiple defendants), the system locates the Party Name in the phrase and compares identified Party Names with the party names in the Matter Profile for that party type.

The Party Field may also be populated based on the Full Title field. For instance, the system checks the party names listed in the Matter Profile against the Full Title field and captures the first instance of a party name. For example: assuming a Full Title such as "DEFENDANT MICROTECH'S OPPOSITION TO PLAINTIFF INNOTECH'S MOTION FOR SUMMARY JUDMGENT ON CLAIM NUMBER FIVE FOR FRAUD," here, the Full Title contains two party names: Microtech and Innotech. The system assumes the document belongs to the first party mentioned. In another example, assuming a Full Title such as "DEFENDANT'S OPPOSITION TO PLAINTIFF'S MOTION FOR SUMMARY JUDMGENT ON CLAIM NUMBER FIVE FOR FRAUD," this example does not have the Party Name, but does have the Party Type. If there is only one party of that type, the system uses the Party Type to determine the Party Name populates the Party field based on the first instance of the party type.

Populating the Date Field may be accomplished using the stamp from the filing service. For instance, in federal court, litigants use a system known as ECF to electronically file documents with the court and automatically serve them on the other parties. Any document filed through ECF system is stamped with a PACER filing stamp, e.g., 1018 in FIG. 10D, and is available for download by the public for a price through a system called PACER. In these instances, the system may find the Date field by locating the PACER/ECF filing stamp at the top of the first page. Note that the stamp actually appears on every page in blue with its own page count. The system then extracts the date after the term "Filed" and uses that to populate the Date field for the document.

For all other documents, the system may locate the date of the document from the signature page, e.g., 1016, extract and populate the Date field with the information.

Populating the Document Type field may be based on the Full Title field, irrespective of whether it is manually inputted or captured based on the auto-population rules discussed above. For instance, once the full title is identified, the system looks within the title for the first instance of one of the recognized document types. For Example: COMPLAINT FOR FRAUD, NEGLIGENT MISREPRESENTATION, AND VIOLATIONS OF SECTION 349 AND 350 OF NEW YORK GENERAL BUSINESS LAW. Here, "COMPLAINT" is the first (and only) instance of a document type in the full title, so it becomes the document type. In some other cases, there is a second instance of a document type within the Full Title. This is usually used to indicate a relationship between two documents. For Example: DEFENDANT MICROTECH'S OPPOSITION TO PLAINTIFF INNOTECH'S MOTION FOR SUMMARY JUDMGENT ON CLAIM NUMBER FIVE FOR FRAUD. Here, there are two document types in the full title: "OPPOSITION" and "MOTION FOR SUMMARY JUDGMENT." The document type is captured by the first instance, e.g., "Opposition." The above rules are exemplary only and are not intended to be exhaustive.

Other fields of the Master File document may be extracted and the metadata field populated, for instance, the Document Number field may be populated from information available from block 1014 by scanning lower left hand corner of any page in the document for string of numbers (e.g., in a smaller font than the rest of the text on the page). If found, the string is captured and added to Document Number field.

Metadata field for evidentiary documents may also be auto-populated in one or more embodiments of the present invention. Obtaining the metadata field information from an evidence document may be based on certain known and presumed attributes for the type of document as illustrated in FIG. 11.

FIG. 11 is an illustration of parsing a typical evidence production page in accordance with one or more embodiments of the present invention. As illustrated, typically each page that is produced in a litigation is branded with a unique identifier known as the Bates number. The branding consists of a prefix that identifies the party producing the document and a number that represents where the page is in that party's production. In a large litigation, the number will typically have a large number of digits, e.g., 7-8. All pages produced by a single party are numbered consecutively across documents. For example, suppose a party (prefix GTL) produces a four page document and a five page document. Example Bates ranges for the two documents could be GTL000001 to GTL000004 for the first document and GTL000005 to GTL000009 for the second document. In most cases the Bates number will be in the footer of the document and in the bottom right corner, e.g., 1106. It could also be centered or on the left corner (rarely). The Format is usually [Bates Prefix][Bates Number]. The prefix is used to identify the party that produced the document. It is unique to that party. Typically, the prefix corresponding to each party in the case has already been entered in the Matter Profile so that this information can be used to further identify the Bates information.

The Bates range is represented by the Bates number on the first page as the start of the range (usually captured in the PRODBEG field in e-discovery databases) and the last page as the end of the range (the PRODEND field).

In one or more embodiments, when the Bates Prefix is identified, Bates prefix field is populated with the identified prefix, the beginning Bates field is populated with the Bates number on that page and based on number of pages, the end Bates Range number field is populated. The system can also retrieve the end Bates number from the last page of the document.

In one or more embodiments the Confidentiality field may also be auto-populated. For instance, in cases involving sensitive information, the court will typically enter what's known as a Protective Order. The Protective Order lays out different confidentiality designations that can be applied to documents or information in the case which correspond to different access levels. Typical designations include CONFIDENTIAL, ATTORNEY'S EYES ONLY, OUTSIDE COUNSEL'S EYES ONLY.

To identify and populate the Confidentiality field, the system scans the footer (e.g., bottom inch) of the first page of the document for Confidentiality designation, e.g., 1104, checks the designations in the Matter Profile against the designation on the page and if there is a match, populates the Confidentiality field with the identified Confidentiality designation.

In one or more embodiments the email header fields may also be auto-populated. For emails uploaded to the Chronology without any metadata, certain fields may be populated based on the top-level email with data provided in block 1102. For instance, the Header fields include the From/To/Cc/Bcc which can be converted to the corresponding Players for these Player fields for the email document. The "Subject" can be used to populate the Subject/Title field with the string after "Subject:" or "Re:" and the Date and Time may be used to populate the date and time fields based on the corresponding fields in the email.

Notepad

In one or more embodiments, the present invention will feature a Notepad wherein users can create work product. This component will have basic word processing functionality, such as fonts, formatting, spacing and the like. Users can utilize the Notepad to enter and delete text, and embed links, images, and objects.

Unlike a typical word processor, users can embed active links to objects in the system within the Notepad. Links can be made to documents, events, Players, and the like. These citations are active in the sense that they can receive and reflect live updates from the system. While a citation appears as text in the document, it is an object that contains additional information beyond the displayed text. For example, if a user cites to a case in the Notepad, hovering or clicking on the case loads a card with information about the case (e.g., documents in the case citing to the case, team comments about the case). If a user cites to a Player, hovering or clicking on the case loads a card with information from the Player's profile. These cards reflect the most up-to-date information in the system related to the object. The user can also launch the object as well (e.g., the document itself, the Player profile) from the link.

If the user embeds link to a document, she may then pull in an excerpt from the document as well into the Notepad. For example, if the user links to a transcript, she can identify a portion of the transcript and insert said portion into the Notepad, along with the relevant citation. The user can also identify the relevant excerpt in the linked document and associate it with the citation without including the excerpt itself in the Notepad.

The Notepad also offers the user the ability to use Blocks, which are sections of text with a particular attribute or set of attributes. There are different types of Blocks, such as themes, issues, questions, evidence, and the like. Blocks can be related to one another and can contain other Blocks (sub-Blocks). If a Block contains a link to an object, the object is associated with the Block and its contents. The user can also assign a value to the citation to define the object's relationship with the Block (e.g., good for us, bad for us). If a Block contains multiple links to objects, the objects are related to one another.

For example, the user can utilize the Notepad to prepare an outline of themes related to the matter. The user can type in the theme and then capture it in a theme Block. The user can then add a sub-Block for supporting evidence and embed links to documents in the system that support the theme. The system will automatically link the cited objects to the theme. The user can then use the theme to search for related documents or to generate a Report with the related documents.

Though the user creates the work product in a freeform word processor, the system can use the Blocks and objects to create useful representations of the information. For example, it can convert an outline or memo into a table with separate columns for issues, supporting evidence and counter evidence.

The Notepad can also be used for the preparation of examination or deposition outlines. The user can set out the potential questions as individual Blocks. Each Block can be assigned a characteristic based on the type of question it is. For example, a question can be classified as "Ask," "Consider," "If door opened," "Rehab," "Redirect," and so on. For questions that require a document, the user can add a sub-Block for related documents. In the sub-Block, the user can embed links to the documents and/or pull in excerpts from those documents.

Review Tool & The Queue

In one or more embodiments, the present invention features a component for reviewing document productions. The review tool has the standard features that users expect, such as searching, viewing, coding and batching. Additionally, this component interacts with other aspects of the invention, such as Evidence, Players List and Calendar.

A user can send documents from the review tool to the Evidence tab or other locations in the system, and vice versa. For example, suppose a team of attorneys is reviewing a document production produced by the opposing party. As this review team identifies important documents, they can elect to send these documents up to the Evidence tab. When attorneys access the Evidence tab, they can view the newly added documents. If the attorneys wish to keep the documents in Evidence tab, they can do so. If not, the attorneys can send the document back to the review tool (e.g., if the document turns out not be that important).

The system also features a workspace between the review tool and the Evidence tab called the Queue. The Queue adds an intermediary layer to the review process. Users can elevate documents to the Queue for a second-level review to determine if the document should be elevated into Evidence or returned to the review tool. Users can set it up so several users review the same document in the Queue and vote on its destination. If the vote exceeds a particular threshold, the document is elevated to Evidence. If not, the document is returned to the review tool.

When documents are added to the review tool, the system pulls the Player information from each document and then associates the document with the existing profiles in the Players List, creates corresponding profiles automatically or allows the user to do so manually. Users can access each Player's profiles to track the status of the review of documents related to that Player. The system tracks such statistics as total number of documents for the Player in the review tool or the Queue, the number of documents for which the Player is a custodian, the number of documents reviewed and coded by the team, the number of documents batched for review, and so on.

Production & Spoliation Analysis

The system analyzes the documents in the review tool for gaps, abnormalities and potential foul play or spoliation. For example, an opposing party makes a production of several thousand documents (e.g., emails, texts). The system can compare this production to other productions in the review tool, and flag instances of potential spoliation. For instance, suppose an email between two Players from opposing parties was produced by one party, but not the other. The system will flag this as an instance of spoliation for investigation. Similarly, the system will identify gaps in productions that should be investigated. For instance, suppose the opposing party produces hundreds of texts for one of its custodians. The system will assess the date ranges in the production to determine if there are gaps where texts should have been produced but were not (e.g., the production consistently spanned an entire year of text communications, but no texts were produced in a certain two-week period).

In conducting its spoliation analysis, the system interacts with documents and events added by users in Evidence. This process helps determine the significance of potential spoliation or missing documents. For example, if the system determines there is a two-week gap in the defendants' text production, it will compare the gap to entries in Evidence.

Suppose the two-week gap contained several critical meetings and conversations between the defendants. The system will flag these key events and connect them to the gap. The system can rate the various instances of spoliation it finds based on their potential significance (e.g., whether or not they are associated with important events).

In one or more embodiments, the invention can assess the completeness of productions vis-à-vis the document requests in the matter. This can be done for incoming productions from other parties to evaluate whether such productions sufficiently meet what is asked for by the requests. It can also be done for outgoing productions to assist the users in determining if they have made sufficient productions in response to the other party's requests.

The system parses document requests capturing each request individually. The system similarly parses objections and responses to each request and links each request with its corresponding objection and/or response. The system analyzes the request to determine the substance of the request and analyzes the response to determine the expected scope of the production with respect to said request. The system then uses this information to evaluate whether the production housed in the review tool sufficiently addresses the request. It will provide a request by request analysis, indicate a confidence level as to whether the request has been satisfied, and a recommendation as to next steps.

For example, suppose the users issued a set of document requests to the opposing party. The system will parse these requests into individual items, such as "All COMMUNICATIONS between Company executives relating to the Falcon deal." For this request, the system will determine the scope of the phrase "Company executives" by looking through the Player profiles and identifying those affiliated with the "Company" that have an executive position there. The system will then group all communications in the review tool between these individuals, and search for key terms and phrases related to the "Falcon deal." The system will assess the completeness of this set of documents and supply the users with a confidence level in such completeness. Additionally, the system will collect these documents in a folder or filtered search for manual review.

Collaborative Predictive Coding

Predictive coding or technology-assisted review is a method of training a computer to identify relevant documents in a corpus of documents. It is becoming a more common methodology used by parties and attorneys to review large amounts of documents (e.g., for production, for relevance). Current methods of predictive coding require users to review a subsection of the corpus of documents—the so-called "seed group"—review and code this set manually and submit the coded set to the computer. The computer extrapolates the coding in the seed set onto the rest of the documents. This extrapolation is tested for accuracy and adjusted as needed (e.g., if the computer incorrectly identifies a document as relevant, the user manually adjusts the coding to reflect the correct status of the document). This process is repeated on several seed groups to refine the system's performance.

The present invention includes a method of collaborative predictive coding that utilizes the user activity in and data from the invention's collaborative elements, such as Evidence, Master File, Feed, Players List, the Notepad, and so on, to identify key documents in the corpus of documents contained in the review tool. The system gathers information or "intelligence" about the matter as the users utilize the various components during their daily workflow. For example, the system analyzes what documents are added to Evidence, how the documents are rated, how they are tagged, who produced them, what Players are on the documents, how many comments were made to the document, who made the comments (e.g., partners versus associates), whether or not the document was shared in the Feed, keywords contained or identified in the documents, and so on. The system will also analyze the specific language captured by annotations, as well as the comments made in connection with the annotation and the tags applied to the excerpt.

This intelligence is used as training data in an active machine learning process, whereby the system learns the important issues and uses this information to identify relevant or important documents contained in the review tool. Documents identified as potentially relevant or important are elevated to the Queue, where they can be evaluated for inclusion in Evidence or sent back to the review tool as "unimportant." When a document is elevated to the Queue, the system can assign a confidence level to it, which indicates the system's confidence in its decision to deem the document relevant. The system also provides a justification for the decision to elevate as well as the confidence level, i.e., by indicating the basis for the decision (e.g., the document referenced three key players and had language similar to some of the highest rated documents in Evidence). When a user elevates or sends back a document, the system uses this action as additional data in honing the algorithm for identifying what is important or relevant, i.e. by updating the intelligence. The intelligence is updated on a real-time basis with each relevant item of user activity. As the intelligence adjusts or is updated, so do the results, i.e., the documents added to the Queue.

Users can also adjust the scope or goal of the machine learning, i.e., what class of documents it wishes the system to identify. For example, users can set the system to seek any document relevant to the Matter (e.g., for production or such documents that have not been produced), only key or critical documents, or documents related to a particular issue, theme or Player.

As an example, suppose a team loads a million documents produced by the other side into the review tool. The team also has identified 100 or so key documents and added them to Evidence. A couple of attorneys reviewed the key documents, rating them for importance, tagging them for issues, and discussing them in the comments and Feed. The attorneys also annotated and tagged important excerpts in some of these key documents. The system analyzes this activity as it happens to develop its intelligence about the matter, and then uses this intelligence to identify potentially relevant documents within the corpus housed on the review tool. For instance, suppose the system determines the highest rated documents involve the same two Players and are dated within a particular two-month period. The system can take this information and search the documents in the review tool for those featuring these two Players within the same period. If these are sufficiently important, they will be elevated to the Queue. Within this subset, the system will compare the contents of these documents to excerpts identified by the attorneys, keywords in the document text or subject lines, and so on. As the attorneys continue to work with the key documents, the system builds up its intelligence and adds more documents to the Queue and adjusts the confidence level of documents already in the Queue. The attorneys can review the documents sent to the Queue and add the ones they care about to key documents, and then collaborate around them (e.g., discuss, annotate, tag, rate, etc.). These actions are used by the system to improve (i.e. update) its intelligence about the matter.

The system can also identify trends, making suggestions about avenues that should be considered in the review. Using the intelligence developed via machine learning, the system will suggest additional custodians that may have key documents or additional issues that might be worth exploring. In the above example, the system will look for additional Players that appear on the documents in that period and in connection with the main key Players. It will then capture these documents in a folder or saved search for the users to review.

Figure 12:
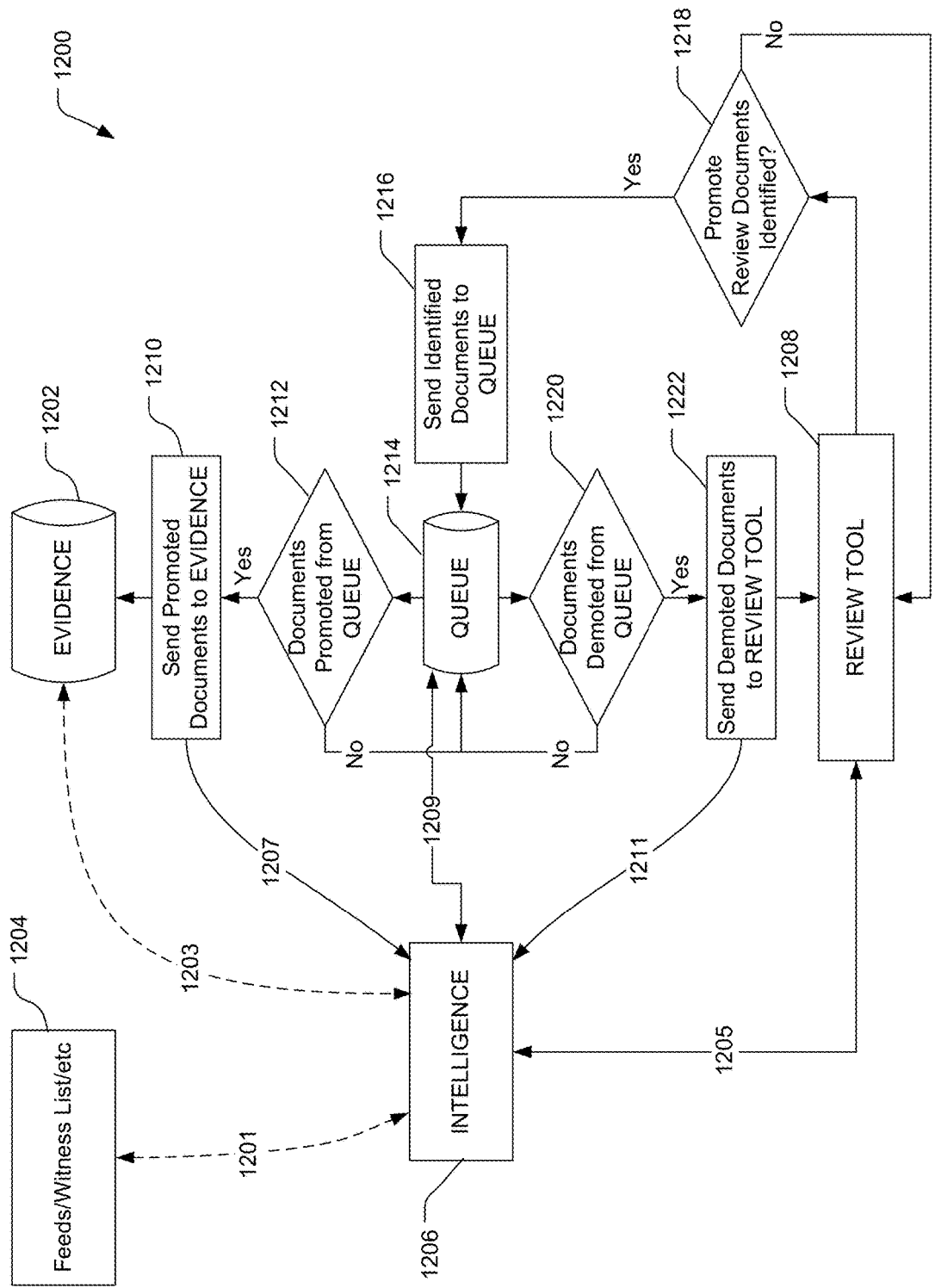
FIG. 12 is an illustration of a Collaborative Predictive Coding in accordance with one or more embodiments of the present invention.

FIG. 12 is an illustration of Collaborative Predictive Coding 1200 in accordance with one or more embodiments of the present invention. As illustrated, the collaborative predictive coding includes an Intelligence module 1206 that utilizes the user activity in and data from the invention's collaborative elements, such as Evidence 1202; Feed/Witness List/etc. 1204 (e.g. Master File, Feed, Players List, the Notepad, etc.), to identify key documents in the corpus of documents contained in the Review Tool 1208. The Intelligence module 1206 gathers information about user activity in Evidence 1202 through path 1203 and from Feed/Witness List/etc. 1204 through path 1201. These paths, i.e. 1201 and 1203, are presented in dashed lines to represent that the Intelligence module is configured to snoop or listen for and collect user activities in these elements/modules but not necessarily configured to control activities in those elements.

In operation, the Intelligence module 1206 may analyze what documents are added to Evidence 1202, how the documents are rated, how they are tagged, who produced them, what Players are on the documents, how many comments were made to the document, who made the comments (e.g., partners versus associates), whether or not the document was shared in the Feed, keywords contained or identified in the documents, and so on. The system may also analyze the specific language captured by annotations, as well as the comments made in connection with the annotation and the tags applied to the excerpt.

The intelligence gathered is applied to the Review Tool 1208 through path 1205 to identify potentially important/relevant documents. This intelligence is used in an active machine learning process, whereby the system learns the important issues and uses this information to identify relevant or important documents contained in the Review Tool 1208. In step 1218, the intelligence is used to check whether there are any documents in the Review Tool 1208 that can be identified as potentially relevant or important. If so, the relevant/important documents are elevated to the Queue 1214 through process step 1216, where they can be evaluated for potential inclusion in Evidence 1202 or sent back to the Review Tool 1208 as "unimportant." Those of skill in the art would appreciate that the Queue, as used herein, is not limited to a specific storage area or a specific hierarchy but could refer to documents tagged in a certain way such that they are identifiable as belonging to the Queue. In addition, there may be multiple queues that could be based on the system's confidence level, for example.

When a document is elevated to the Queue 1214, the system can assign a confidence level to it, which indicates the system's confidence in its decision to deem the document relevant. Thus, through path 1209, the system gathers information about the Queue 1214 and may adjust the ordering of the documents in the Queue 1214 based on confidence level of the importance of the document. The system also provides a justification for the decision to elevate as well as the confidence level, i.e., by indicating the basis for the decision (e.g., the document referenced three key players and had language similar to some of the highest rated documents in Evidence).

A user can evaluate documents in the Queue 1214 to decide whether to promote the document in step 1212 or to demote the document in step 1220. When a user promotes or demotes a document, the Intelligence module uses this action as additional data in training the algorithm for identifying what is important or relevant. Thus, from block 1210, documents that are promoted are sent to Evidence 1202 and that information is forwarded to the Intelligence module 1206 through path 1207. Also, from block 1222, documents that are demoted are sent to Review Tool 1208 and that information is forwarded to the Intelligence module 1206 through path 1211. Thus, the intelligence in Intelligence module 1206 adjusts, i.e. updated, with each relevant item of user activity in the Queue 1214. As the intelligence adjusts, so do the results, i.e., the documents added to the Queue 1214.

Figure 13:
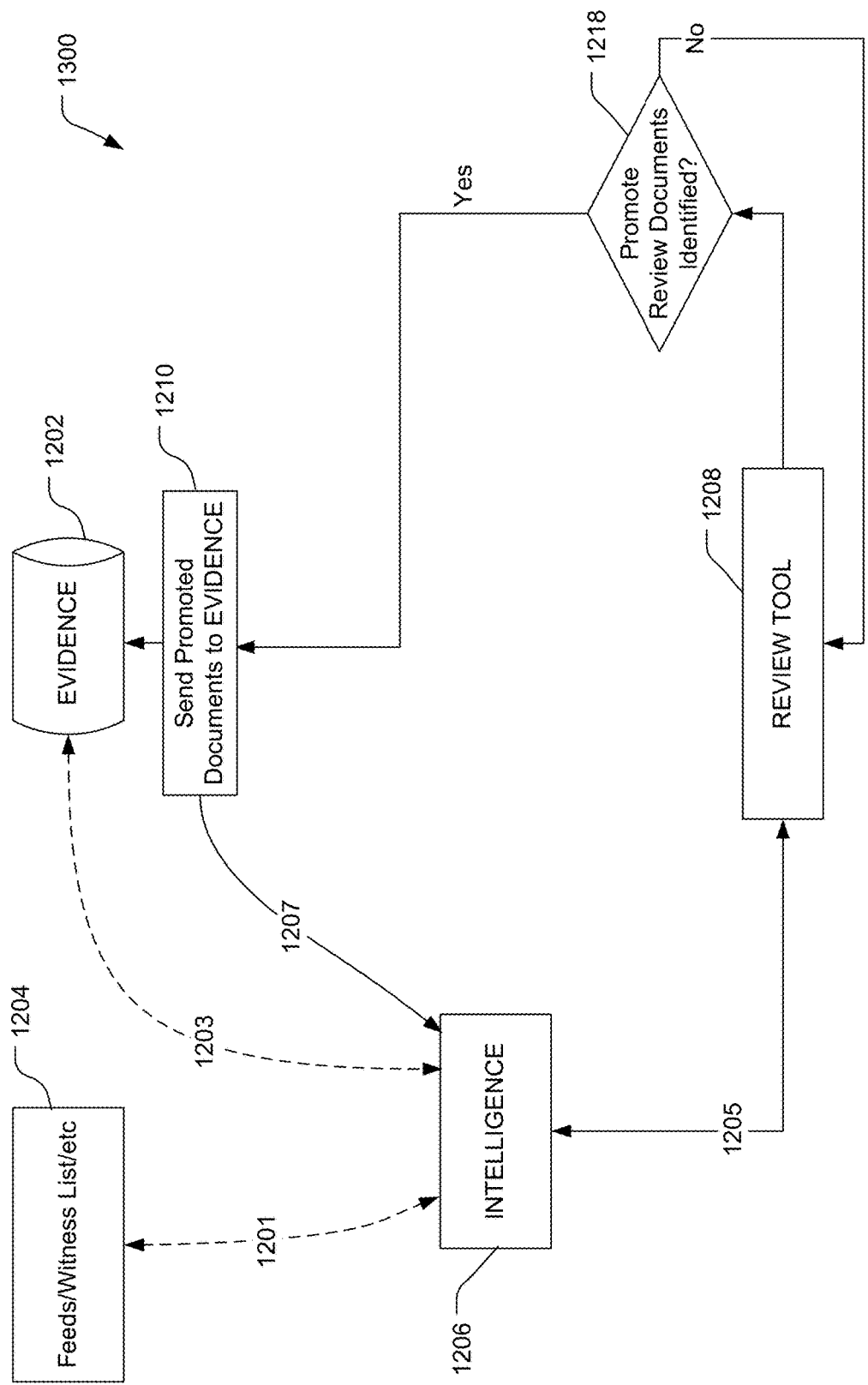
FIG. 13 is an illustration of a second Collaborative Predictive Coding scheme in accordance with one or more embodiments of the present invention.

FIG. 13 is an illustration of a second Collaborative Predictive Coding 1300 in accordance with one or more embodiments of the present invention. In the illustrated embodiment, the Queue of FIG. 12 and its associated processing elements are eliminated or bypassed and the identified documents, i.e. step 1218, are promoted directly to Evidence 1202 from Review Tool 1208.

While the invention herein disclosed has been described by means of specific embodiments and applications thereof, numerous modifications and variations could be made thereto by those skilled in the art without departing from the scope of the invention set forth in the claims.

What is claimed is:

1. A method for collaborative matter management comprising:

continuously gathering intelligence to a matter from all collaborative elements of the matter, wherein said gathering intelligence comprises listening and collecting user activities and data in the collaborative elements, wherein the collaborative elements comprise a group of at least one of an evidence database, feeds, witness lists, Master Files, Players, Syncing the Master File with an Electronic Court Docket, Automatic Document Linking, Authentication, Discovery Tools, video and transcript management, Confidentiality Designations, Spoliation Analysis, Text message Management, Calendar, Print to Cloud, and notes, wherein the evidence database comprises one or more key documents and wherein the notes are associated with the one or more key documents;

actively training a machine learning algorithm using the intelligence as training data, wherein the intelligence is updated on a real time basis;

continuously applying said trained machine learning algorithm to a plurality of documents in a review tool to identify and elevate one or more documents in said plurality of documents to a queue;

the machine learning algorithm assigning a confidence level and providing a justification for each of the one or more documents elevated to the queue, wherein the justification is an indication of a basis for elevation to the queue including similarities in language with highest rated documents that have already been promoted to the evidence database and relationship with at least two players already associated with documents in the evidence database;

the machine learning algorithm continuously reviewing and adjusting the confidence level of each of the one or more documents in the queue and ordering the documents in the queue based on the confidence level;

obtaining inputs from a user's evaluation of documents in the queue to identify any document in the queue for promotion to the evidence database or for return to the review tool, wherein the review tool interacts with the collaborative element including the calendar, wherein the calendar automatically create later and linked entries for a briefing schedule;

updating said intelligence for said active training of said machine learning algorithm if the user identifies one or more of the documents in the queue for promotion to the evidence database or for return to the review tool;

returning to the review tool the one or more documents in the queue identified for return by the user; and promoting to the evidence database said one or more documents in the queue identified for promotion by the user.

2. The method of claim 1, wherein said data from the collaborative elements comprises annotations, comments made in connection with the annotations, and tags applied to excerpts in a collaborative element.

3. The method of claim 1, wherein said activities comprises one or more information from a group comprising what documents are added to the evidence database, how the documents are rated, how they are tagged, who produced them, what Players are on the documents, how many comments were made to the documents, who made the comments, whether or not the documents were shared in the feeds, keywords contained or identified in the documents.

4. The method of claim 1, wherein the intelligence adjusts in real-time with each item of user activity in the matter.

5. The method of claim 1, further comprising:
providing a user interface configured for the user to review and identify documents in said queue for promotion to the evidence database or for return to the review tool.

6. The method of claim 5, wherein an action by said user identifying a document for promotion validates the training data for the active machine learning algorithm.

7. The method of claim 5, wherein an action by said user identifying a document for return to the review tool negatively adjusts the training data for the active machine learning algorithm.

8. A method for collaborative matter management comprising:
continuously gathering intelligence comprising user activities and data on all collaborative elements of a matter, wherein the collaborative elements comprise a group of at least one of an evidence database, feeds, witness lists, Master Files, Players, Syncing the Master File with an Electronic Court Docket, Automatic Document Linking, Authentication, Discovery Tools, video and transcript management, Confidentiality Designations, Spoliation Analysis, Text message Management, Calendar, Print to Cloud, and notes, wherein the evidence database comprises one or more key documents and wherein the notes are associated with the one or more key documents;

actively using the intelligence as training data for a machine learning algorithm, wherein the intelligence is updated on a real time basis;

continuously applying said trained machine learning algorithm to a plurality of documents in a review tool to identify and elevate one or more potentially documents in said plurality of documents to a queue;

the machine learning algorithm assigning a confidence level and providing a justification for each of the one or more documents elevated to the queue, wherein the justification is an indication of a basis for elevation to the queue including similarities in language with highest rated documents that have already been promoted to the evidence database and relationship with at least two players already associated with documents in the evidence database; and the machine learning algorithm continuously reviewing and adjusting the confidence level of each document in the queue and ordering the documents in the queue based on the confidence level.

9. The method of claim 8, wherein the intelligence adjusts in real-time with each item of user activity.

10. The method of claim 8, further comprising:
providing a user interface configured for a user to review and identify documents in said queue for promotion to the evidence database or for return to the review tool.

11. The method of claim 9, further comprising:
obtaining inputs from a user's evaluation of documents in the queue to identify any document in the queue for promotion to the evidence database or for return to the review tool;
updating said intelligence for said active training of said machine learning algorithm if the user identifies one or more of the documents in the queue for promotion to the evidence database or for return to the review tool;
returning to the review tool the one or more documents in the queue identified for return by the user; and
promoting to the evidence database the one or more documents in the queue identified for promotion by the user.

12. The method of claim 11, wherein an action by said user identifying for promotion to the evidence database validates said training data for the active machine learning algorithm.

13. The method of claim 11, wherein an action by said user identifying a document for return to the review tool adjusts the training data for the active machine learning algorithm.

14. The method of claim 8, wherein said data from the collaborative elements comprises annotations, comments made in connection with the annotations, and the tags applied to excerpts in a collaborative element.

15. The method of claim 8, wherein said activities comprises one or more information from a group comprising what documents are added to evidence, how the documents are rated, how they are tagged, who produced them, what Players are on the documents, how many comments were made to the documents, who made the comments, whether or not the documents were shared in the feeds, keywords contained or identified in the documents.

16. A non-transitory computer-readable medium comprising computer-readable instructions for collaborative matter management, wherein execution of said computer-readable instructions by one or more processors causes said one or more processors to:
continuously gather intelligence to a matter from all collaborative elements of the matter, wherein said gathering intelligence comprises listening and collecting user activities and data in the collaborative elements, wherein the collaborative elements comprise a group of at least one of an evidence database, feeds, witness lists, Master Files, Players, Syncing the Master File with an Electronic Court Docket, Automatic Document Linking, Authentication, Discovery Tools, video and transcript management, Confidentiality Designations, Spoliation Analysis, Text message Management, Calendar, Print to Cloud, and notes, wherein the evidence database comprises one or more key documents and wherein the notes are associated with the one or more key documents;

actively train a machine learning algorithm using the intelligence as training data, wherein the intelligence is updated on a real time basis;

continuously apply said trained machine learning algorithm to a plurality of documents in a review tool to identify and elevate one or more documents in said plurality of documents to a queue;

the machine learning algorithm assigns a confidence level and provides a justification for each of the one or more documents elevated to the queue, wherein the justification is an indication of a basis for elevation to the queue including similarities in language with highest rated documents that have already been promoted to the evidence database and relationship with at least two players already associated with documents in the evidence database; and the machine learning algorithm continuously reviews and adjusts the confidence level of each document in the queue and order the documents in the queue based on the confidence level.

17. The non-transitory computer-readable medium of claim 15, wherein execution of said computer-readable instructions by said one or more processors further causes said one or more processors to:

obtain inputs from a user's evaluation of documents in the queue to identify any document in the queue for promotion to the evidence database or for return to the review tool;

update said intelligence for said active training of said machine learning algorithm if the user identifies one or more of the documents in the queue for promotion to the evidence database or for return to the review tool;

return to the review tool the one or more documents in the queue identified for return by the user; and promote to the evidence database said one or more documents in the queue identified for promotion by the user.

18. The non-transitory computer-readable medium of claim 16, wherein said data in the collaborative elements comprises annotations, comments made in connection with the annotations, and tags applied to excerpts in a collaborative element.

19. The non-transitory computer-readable medium of claim 16, wherein said activities comprises one or more information from a group comprising what documents are added to the evidence database, how the documents are rated, how they are tagged, who produced them, what Players are on the documents, how many comments were made to the document, who made the comments, whether or not the document was shared in the feeds, keywords contained or identified in the documents.

20. The non-transitory computer-readable medium of claim 17, wherein execution of said computer-readable instructions by said one or more processors further causes said one or more processors to:

provide a user interface configured for the user to review and identify documents in said queue for promotion to the evidence database or for return to the review tool.

* * * * *